US012676645B2

(12) United States Patent
Elshafie et al.

(10) Patent No.: US 12,676,645 B2
(45) Date of Patent: Jul. 7, 2026

(54) MANAGING CONFLICTING CONFIGURATIONS FOR CONFIGURING A REFLECTIVE SURFACE

(71) Applicant: QUALCOMM INCORPORATED, San Diego, CA (US)

(72) Inventors: Ahmed Elshafie, San Diego, CA (US); Yu Zhang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 18/556,071

(22) PCT Filed: Jun. 7, 2021

(86) PCT No.: PCT/CN2021/098549
§ 371 (c)(1),
(2) Date: Oct. 18, 2023

(87) PCT Pub. No.: WO2022/256954
PCT Pub. Date: Dec. 15, 2022

(65) Prior Publication Data
US 2024/0187042 A1 Jun. 6, 2024

(51) Int. Cl.
*H04B 7/04* (2017.01)
*H04W 72/566* (2023.01)

(52) U.S. Cl.
CPC ...... *H04B 7/04013* (2023.05); *H04W 72/566* (2023.01)

(58) Field of Classification Search
CPC .. H04B 7/04013; H04B 7/026; H04B 7/0639; H04B 7/0634; H04W 72/566; H04W 24/04; H04W 40/22
See application file for complete search history.

(56) References Cited

U.S. PATENT DOCUMENTS

2018/0115958 A1 4/2018 Raghavan et al.
2021/0168684 A1 6/2021 Kang et al.
(Continued)

FOREIGN PATENT DOCUMENTS

CN 111163511 A 5/2020

OTHER PUBLICATIONS

Hou T., et al., "Reconfigurable Intelligent Surface Aided NOMA Networks", IEEE Journal on Selected Areas in Communications, IEEE Service Center, Piscataway, US, vol. 38, No. 11, Jul. 2, 2020 (Jul. 2, 2020), pp. 2575-2588, XP011815031, ISSN: 0733-8716, DOI: 10.1109/JSAC.2020.3007039, retrieved on Oct. 15, 2020] abstract, Section III, p. 2577-p. 2581, figure 1.
(Continued)

*Primary Examiner* — Thai Nguyen
(74) *Attorney, Agent, or Firm* — Holland & Hart LLP/Qualcomm Incorporated

(57) ABSTRACT

Methods, systems, and devices for wireless communications are described. A surface used to reflect radio frequency signals may receive requests from multiple devices to configure a set of reflection coefficients. Each request may include a set of reflection coefficients and an indication of a priority level of communications associated with the set of reflection coefficients. A set of reflection coefficients included in a message transmitted from a device may be based on a position of another device relative to the device and the surface. The surface may configure a set of reflection coefficients based on the priority levels associated with the sets of reflection coefficients received in the requests.

30 Claims, 18 Drawing Sheets

(56)         References Cited

U.S. PATENT DOCUMENTS

| | | | |
|---|---|---|---|
| 2023/0040183 A1* | 2/2023 | Xu | H04B 7/145 |
| 2023/0266458 A1* | 8/2023 | Liu | G01S 5/0273 |
| | | | 342/125 |
| 2023/0318177 A1* | 10/2023 | Zhou | H04L 25/0204 |
| | | | 455/456.1 |

OTHER PUBLICATIONS

International Search Report and Written Opinion—PCT/CN2021/098549—ISA/EPO—Feb. 2, 2022.

Partial International Search Report—PCT/CN2021/098549—ISA/EPO—Nov. 17, 2021.

Wu Q., et al., "Towards Smart and Reconfigurable Environment: Intelligent Reflecting Surface Aided Wireless Network", IEEE Communications Magazine, IEEE Service Center, Piscataway, US, vol. 58, No. 1, Jan. 1, 2020 (Jan. 1, 2020), XP011768215, pp. 106-112, ISSN: 0163-6804, DOI: 10.1109/MCOM.001.1900107 [retrieved on Jan. 24, 2020] abstract, pp. 106-110, figures 1, 2.

* cited by examiner

710

720

715

705

700

1210

1220

1215

1205

1200

Communications Manager

Reconfiguration Component

1325

Receiver

1310

Priority Component

1330

Transmitter

1315

Reflection Configuration
Component

1335

1320

1305

1300

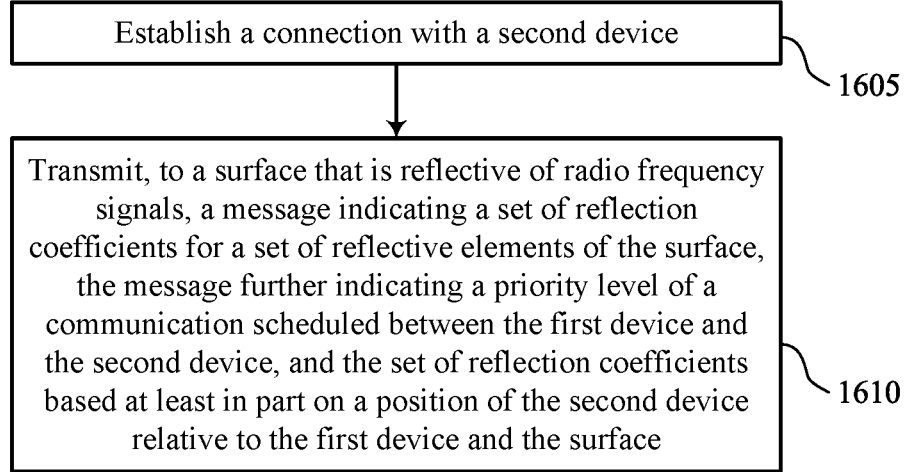

Establish a connection with a second device

1605

Transmit, to a surface that is reflective of radio frequency signals, a message indicating a set of reflection coefficients for a set of reflective elements of the surface, the message further indicating a priority level of a communication scheduled between the first device and the second device, and the set of reflection coefficients based at least in part on a position of the second device relative to the first device and the surface

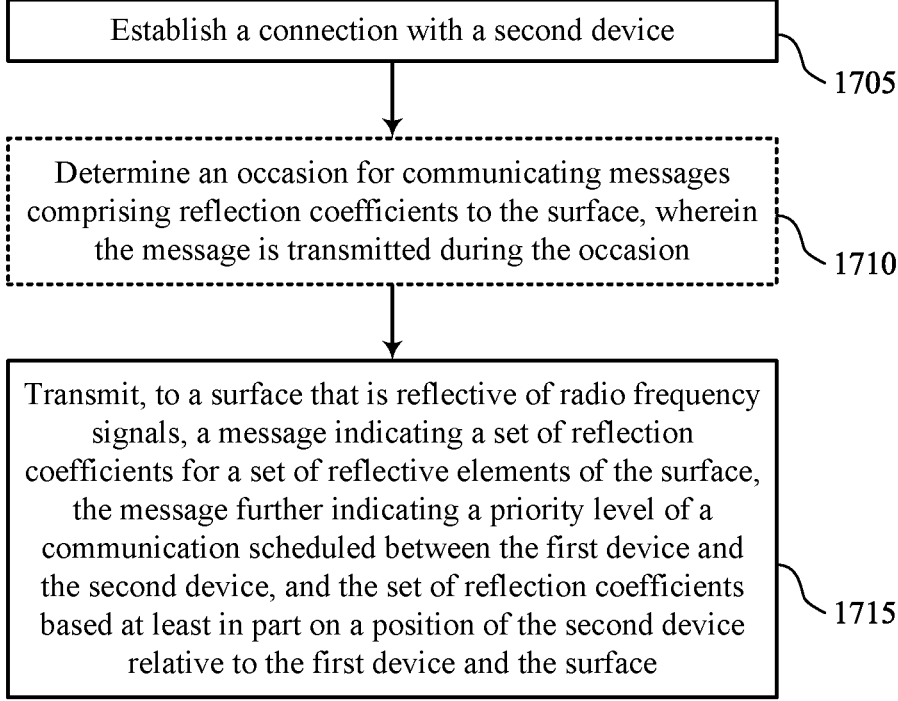

Establish a connection with a second device

1705

Determine an occasion for communicating messages comprising reflection coefficients to the surface, wherein the message is transmitted during the occasion

1710

Transmit, to a surface that is reflective of radio frequency signals, a message indicating a set of reflection coefficients for a set of reflective elements of the surface, the message further indicating a priority level of a communication scheduled between the first device and the second device, and the set of reflection coefficients based at least in part on a position of the second device relative to the first device and the surface

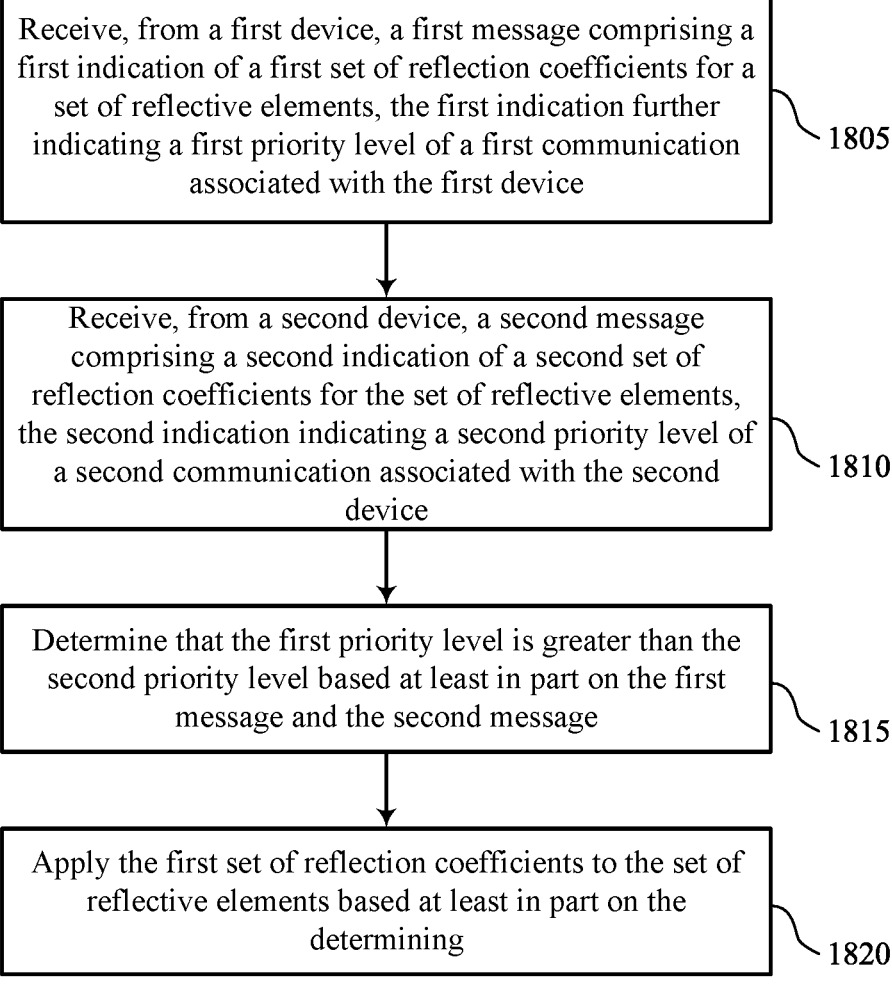

Receive, from a first device, a first message comprising a first indication of a first set of reflection coefficients for a set of reflective elements, the first indication further indicating a first priority level of a first communication associated with the first device — 1805

Receive, from a second device, a second message comprising a second indication of a second set of reflection coefficients for the set of reflective elements, the second indication indicating a second priority level of a second communication associated with the second device — 1810

Determine that the first priority level is greater than the second priority level based at least in part on the first message and the second message — 1815

Apply the first set of reflection coefficients to the set of reflective elements based at least in part on the determining — 1820

MANAGING CONFLICTING CONFIGURATIONS FOR CONFIGURING A REFLECTIVE SURFACE

CROSS REFERENCE

The present application is a 371 national stage filing of International PCT Application No. PCT/CN2021/098549 by Elshafie et al. entitled "MANAGING CONFLICTING CONFIGURATIONS FOR CONFIGURING A REFLECTIVE SURFACE," filed Jun. 7, 2021, which is assigned to the assignee hereof, and which is expressly incorporated by reference in its entirety herein.

INTRODUCTION

The following relates to wireless communications, including communications using a reflective surface.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first device is described. The method may include establishing a connection with a second device. The method may also include transmitting, to a surface that is reflective of radio frequency signals, a message indicating a set of reflection coefficients for a set of reflective elements of the surface. In some examples, the message further indicates a priority level of a communication scheduled between the first device and the second device. In some examples, the set of reflection coefficients is based on a position of the second device relative to the first device and the surface.

An apparatus for wireless communication at a first device is described. The apparatus may include a processor and memory coupled to the processor. The memory and processor may be configured to establish a connection with a second device. The memory and processor may be configured to transmit, to a surface that is reflective of radio frequency signals, a message indicating a set of reflection coefficients for a set of reflective elements of the surface. In some examples, the message further indicates a priority level of a communication scheduled between the first device and the second device. In some examples, the set of reflection coefficients is based on a position of the second device relative to the first device and the surface.

Another apparatus for wireless communication at a first device is described. The apparatus may include means for establishing a connection with a second device. The apparatus may include means for transmitting, to a surface that is reflective of radio frequency signals, a message indicating a set of reflection coefficients for a set of reflective elements of the surface. In some examples, the message further indicates a priority level of a communication scheduled between the first device and the second device. In some examples, the set of reflection coefficients is based on a position of the second device relative to the first device and the surface.

A non-transitory computer-readable medium storing code for wireless communication at a first device is described. The code may include instructions executable by a processor to establish a connection with a second device. The code may include instructions executable by a processor to transmit, to a surface that is reflective of radio frequency signals, a message indicating a set of reflection coefficients for a set of reflective elements of the surface. In some examples, the message further indicates a priority level of a communication scheduled between the first device and the second device. In some examples, the set of reflection coefficients is based on a position of the second device relative to the first device and the surface.

Some examples of the method, apparatuses, and non-transitory computer-readable medium described herein may further include operations, features, means, or instructions for determining the position of the second device relative to the surface, selecting, based on the position of the second device, an index corresponding to the set of reflection coefficients from a set of multiple sets of reflection coefficients, and generating the message based on the index corresponding to the set of reflection coefficients.

Some examples of the method, apparatuses, and non-transitory computer-readable medium described herein may further include operations, features, means, or instructions for determining one or more characteristics of the communication that may be associated with the priority level of the communication. The one or more characteristics may include an application associated with the communication, a quality of service associated with the communication, a quantity of devices served by the first device: an amount of data scheduled to be communicated in the communication within a time period, traffic statistics associated with a service provided by the first device, a duration associated with completing the communication: or any combination thereof and generating the message based on the one or more characteristics.

Some examples of the method, apparatuses, and non-transitory computer-readable medium described herein may further include operations, features, means, or instructions for transmitting a second message reducing the priority level of the communication between the first device and the second device.

Some examples of the method, apparatuses, and non-transitory computer-readable medium described herein may further include operations, features, means, or instructions for transmitting, to the surface, an identifier of a device that may have been designated to resolve conflicts between devices.

In some examples of the method, apparatuses, and non-transitory computer-readable medium described herein, the first device may be the device that may have been designated to resolve conflicts between devices, and the message transmitted from the first device to the surface includes the identifier.

Some examples of the method, apparatuses, and non-transitory computer-readable medium described herein may further include operations, features, means, or instructions for receiving, from a third device, a second message assigning the identifier to the first device.

Some examples of the method, apparatuses, and non-transitory computer-readable medium described herein may further include operations, features, means, or instructions for receiving, based on transmitting the identifier to the surface, a request to select one set of reflection coefficients from a set of multiple sets of reflection coefficients associated with a set of multiple devices. Some examples of the method, apparatuses, and non-transitory computer-readable medium described herein may further include selecting a second set of reflection coefficients based on priority levels associated with the set of multiple devices. Some examples of the method, apparatuses, and non-transitory computer-readable medium described herein may further include transmitting, to the surface, a second message including an index corresponding to the second set of reflection coefficients.

Some examples of the method, apparatuses, and non-transitory computer-readable medium described herein may further include operations, features, means, or instructions for determining an occasion for communicating messages including reflection coefficients to the surface, where the message may be transmitted during the occasion.

Some examples of the method, apparatuses, and non-transitory computer-readable medium described herein may further include operations, features, means, or instructions for receiving, from the surface, a second message indicating that the set of reflection coefficients may be being applied for the surface. Some examples of the method, apparatuses, and non-transitory computer-readable medium described herein may further include applying, based on the set of reflection coefficients being indicated in the second message, a set of beam coefficients to a signal for the second device to obtain a beam signal, where the beam signal may be directed toward the surface based on the set of beam coefficients and a reflection of the signal off of the surface may be directed toward the second device based on the set of reflection coefficients.

Some examples of the method, apparatuses, and non-transitory computer-readable medium described herein may further include operations, features, means, or instructions for receiving, from the surface, a second message indicating that a different set of reflection coefficients may be being applied for the surface. Some examples of the method, apparatuses, and non-transitory computer-readable medium described herein may further include determining a set of beam coefficients for communicating with the second device based on the different set of reflection coefficients, and applying the set of beam coefficients to a signal for the second device based on the determining.

A method for wireless communication at a surface that is reflective of radio frequency signals is described. The method may include receiving, from a first device, a first message including a first indication of a first set of reflection coefficients for a set of reflective elements, the first indication further indicating a first priority level of a first communication associated with the first device. The method may include receiving, from a second device, a second message including a second indication of a second set of reflection coefficients for the set of reflective elements, the second indication indicating a second priority level of a second communication associated with the second device. The method may include determining that the first priority level is greater than the second priority level based on the first message and the second message. The method may include applying the first set of reflection coefficients to the set of reflective elements based on the determining.

An apparatus for wireless communication at a surface that is reflective of radio frequency signals is described. The apparatus may include a processor and memory coupled to the processor. The processor and memory may be configured to receive, from a first device, a first message including a first indication of a first set of reflection coefficients for a set of reflective elements, the first indication further indicating a first priority level of a first communication associated with the first device. The processor and memory may be configured to receive, from a second device, a second message including a second indication of a second set of reflection coefficients for the set of reflective elements, the second indication indicating a second priority level of a second communication associated with the second device. The processor and memory may be configured to determine that the first priority level is greater than the second priority level based on the first message and the second message. The processor and memory may be configured to apply the first set of reflection coefficients to the set of reflective elements based on the determining.

Another apparatus for wireless communication at a surface that is reflective of radio frequency signals is described. The apparatus may include means for receiving, from a first device, a first message including a first indication of a first set of reflection coefficients for a set of reflective elements, the first indication further indicating a first priority level of a first communication associated with the first device. The apparatus may include means for receiving, from a second device, a second message including a second indication of a second set of reflection coefficients for the set of reflective elements, the second indication indicating a second priority level of a second communication associated with the second device. The apparatus may include means for determining that the first priority level is greater than the second priority level based on the first message and the second message. The apparatus may include means for applying the first set of reflection coefficients to the set of reflective elements based on the determining.

A non-transitory computer-readable medium storing code for wireless communication at a surface that is reflective of radio frequency signals is described. The code may include instructions executable by a processor to receive, from a first device, a first message including a first indication of a first set of reflection coefficients for a set of reflective elements, the first indication further indicating a first priority level of a first communication associated with the first device. The code may include instructions executable by a processor to receive, from a second device, a second message including a second indication of a second set of reflection coefficients for the set of reflective elements, the second indication indicating a second priority level of a second communication associated with the second device. The code may include instructions executable by a processor to determine that the first priority level is greater than the second priority level based on the first message and the second message. The code may include instructions executable by a processor to apply the first set of reflection coefficients to the set of reflective elements based on the determining.

Some examples of the method, apparatuses, and non-transitory computer-readable medium described herein may further include operations, features, means, or instructions for determining the first priority level for the first communication based on one or more first characteristics of the first communication indicated in the first message and the second priority level for the second communication based on one or more second characteristics of the second communication indicated in the second message and comparing the first priority level and the second priority level, where the first priority level may be determined as greater than the second priority level based on the comparing.

In some examples of the method, apparatuses, and non-transitory computer-readable medium described herein, the one or more first characteristics of the first communication includes a first application associated with the first communication, a first quality of service associated with the first communication, a first quantity of communication devices served by the first device, a first amount of data scheduled to be communicated in the first communication within a time period, first traffic statistics associated with a first service provided by the first device, a first duration associated with completing the first communication, or any combination thereof. In some examples of the method, apparatuses, and non-transitory computer-readable medium described herein, the one or more second characteristics of the second communication includes a second application associated with the second communication, a second quality of service associated with the second communication, a second quantity of communication devices served by the second device, a second amount of data scheduled to be communicated in the second communication within the time period: second traffic statistics associated with a second service provided by the second device, a second duration associated with completing the second communication, or any combination thereof.

In some examples of the method, apparatuses, and non-transitory computer-readable medium described herein, applying the first set of reflection coefficients to the set of reflective elements may include operations, features, means, or instructions for applying the first set of reflection coefficients for at least the first duration based on determining that the first priority level may be higher than the second priority level.

Some examples of the method, apparatuses, and non-transitory computer-readable medium described herein may further include operations, features, means, or instructions for receiving, from the first device, a third message reducing the first priority level of the first communication and applying the second set of reflection coefficients to the set of reflective elements based on the first priority level being reduced.

Some examples of the method, apparatuses, and non-transitory computer-readable medium described herein may further include operations, features, means, or instructions for receiving, from a third device, a third message including a third indication of a third set of reflection coefficients for the set of reflective elements, the third indication indicating a third priority level of a third communication associated with the third device, the third priority level being greater than the first priority level and applying, after applying the first set of reflection coefficients, the third set of reflection coefficients to the set of reflective elements based on the third priority level being greater than the first priority level.

In some examples of the method, apparatuses, and non-transitory computer-readable medium described herein, applying, based on receiving the first message, the first set of reflection coefficients to the set of reflective elements, initiating a timer based on applying the first set of reflection coefficients, where the second message may be received before an expiration of the timer, and continuing to apply the first set of reflection coefficients to the set of reflective elements until the expiration of the timer based on the first priority level being higher than the second priority level.

Some examples of the method, apparatuses, and non-transitory computer-readable medium described herein may further include operations, features, means, or instructions for buffering the second message based on receiving the second message before the expiration of the timer and applying the second set of reflection coefficients to the set of reflective elements at the expiration of the timer.

In some examples of the method, apparatuses, and non-transitory computer-readable medium described herein, the first message further includes an identifier of a device that may have been designated to resolve conflicts between devices, and the first priority level may be determined as being higher than the second priority level based on receiving the identifier in the first message.

Some examples of the method, apparatuses, and non-transitory computer-readable medium described herein may further include operations, features, means, or instructions for receiving, from a third device and based on the surface concurrently receiving the first message with the second message, a third message indicating that the first priority level may be greater than the second priority level, where an identifier of a device that may have been designated to resolve conflicts between devices being assigned to the third device.

Some examples of the method, apparatuses, and non-transitory computer-readable medium described herein may further include operations, features, means, or instructions for receiving the first message and the second message during an occasion for communicating messages including reflection coefficients to the surface and transmitting, after an end of the occasion, a third message indicating a selection of the first set of reflection coefficients for applying to the set of reflective elements.

In some examples of the method, apparatuses, and non-transitory computer-readable medium described herein, the third message includes an identifier of the first device, an index associated with the first set of reflection coefficients, or both.

BRIEF DESCRIPTION OF THE DRAWINGS

FIGS. 16 through 18 show flowcharts illustrating methods that support managing conflicting configurations for configuring a reflective surface in accordance with one or more aspects of the present disclosure.

DETAILED DESCRIPTION

Figure 1:
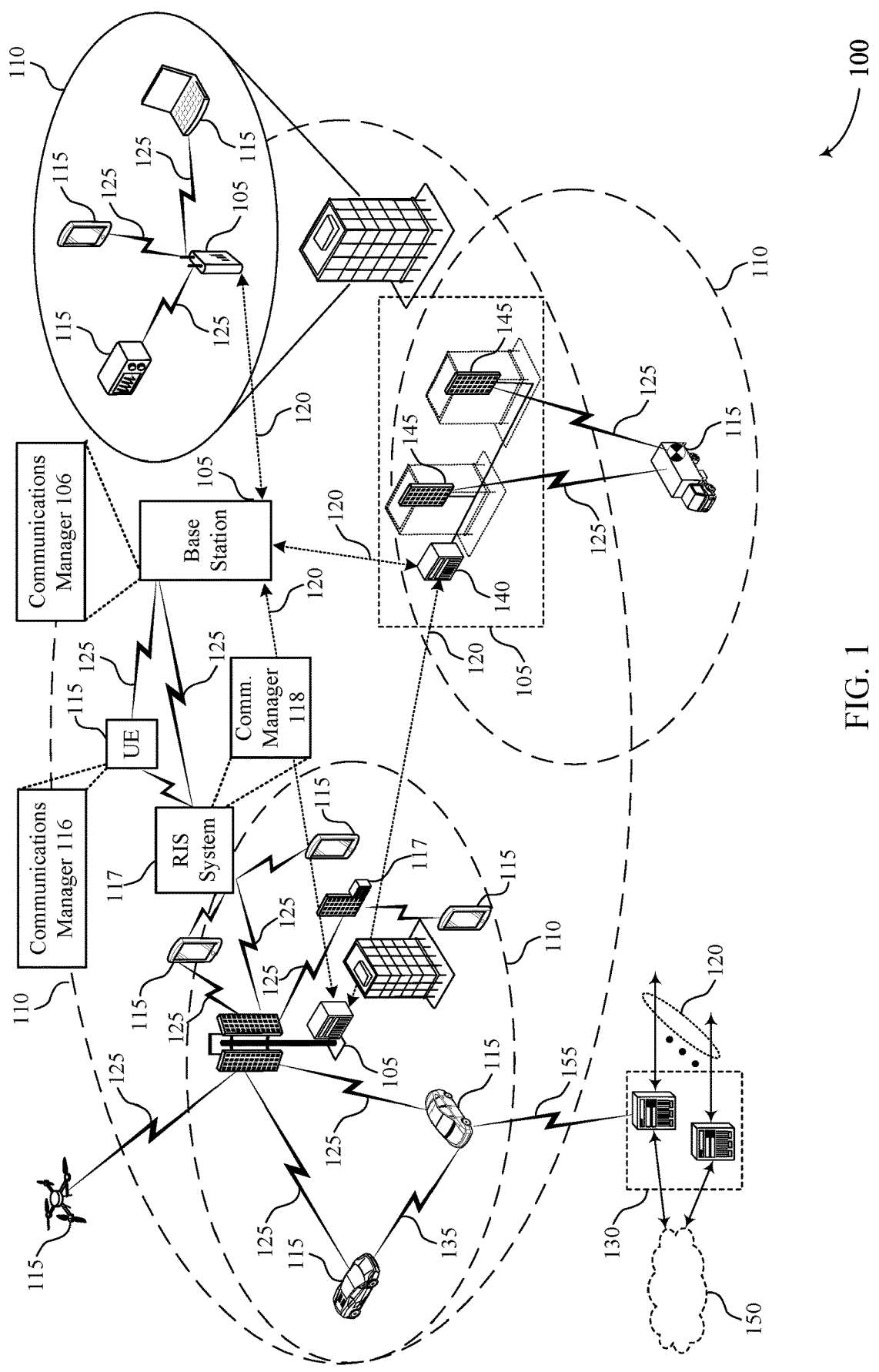
FIG. 1 illustrates an example of a wireless communications system that supports managing conflicting configurations for configuring a reflective surface in accordance with one or more aspects of the present disclosure.

A radio access network may employ reconfigurable surfaces (which may also be referred to as reconfigurable intelligent surfaces (RISs)) to increase a communications range of devices with minimal increase to an amount of power consumed by the radio access network. A reconfigurable surface may include an array of reflective elements that can be semi-statically configured to change an angle of reflection of the reconfigurable surface—e.g., by adjusting reflection coefficients for the reflective elements. In some examples, a device that has established a connection with another device may instruct (which may be used interchangeably with the terms command, direct, or order), request, or trigger, via a wired or wireless link, the reconfigurable surface to configure the angle of reflection so that the reconfigurable surface will redirect a signal transmitted from the device in the direction of the other device, and vice versa. In some examples, to instruct, request, or trigger the reconfigurable surface to configure the angle of reflection, a device may transmit a message to the reconfigurable surface that includes a corresponding configuration for the reconfigurable surface. In one or more examples, configuring the angle of reflection may include changing amplitude and phase modulation parameters at the reconfigurable surface.

To increase a utilization of reconfigurable surfaces in a radio access network, reconfigurable surfaces may be configured to support the reception of configurations from multiple devices over multiple links (e.g., wired links, wireless links, or both). Thus, multiple types of devices (e.g., base stations, UEs, or both) may be able to control a reconfigurable surface via multiple links. Also, an angle of reflection of a reconfigurable surface may be adapted based on a configuration received from a first communications device to support communications for the first communications device during a first interval and readapted based on a configuration received from a second communications device to support communications for the second communications device during a second interval. In some examples, the reconfigurable surface may receive configurations from two or more devices but may be able to implement only one of the configurations. Procedures for resolving conflicting configurations may not be established, and thus, neither of the configurations may be implemented by the reconfigurable surface.

To support receiving, over wired or wireless links from multiple devices, multiple configurations to configure a reconfigurable surface with respective angles of reflection, procedures for prioritizing the configurations may be established. In some examples, a device transmits, to a reconfigurable surface, a message indicating a set of reflection coefficients (e.g., one or more reflection coefficients) and a priority of a communication associated with the set of reflection coefficients. In some examples, one or more additional devices may transmit similar messages to the reconfigurable surface—e.g., before, concurrently with, or after the device transmits the message. Messages that are transmitted concurrently may include messages that are transmitted using overlapping (completely or partially) time resources.

The reconfigurable surface may receive the message transmitted by the device. In some examples, the reconfigurable surface may also receive (e.g., concurrently or subsequently) one or more messages from one or more additional devices. In some examples, the messages received at the reconfigurable surface may conflict with one another— e.g., configuring one set of reflection coefficients indicated by one message may be incompatible with configuring another set of reflection coefficients indicated by another message. In some examples, when conflicting messages are received, the reconfigurable surface determines priorities of the conflicting messages and applies the set of reflection coefficients indicated in the message associated with the highest priority communications.

By indicating priority information in messages indicating reflection coefficients, a reconfigurable surface may be able to use the messages to determine which reflection coefficients to apply. By determining which reflection coefficients to apply to a reconfigurable surface based on priority information included in the messages, the reconfigurable surface may configure the reflection coefficients that support the highest priority communications. By configuring the reconfigurable surface in favor of the highest priority communications, disruptions of an experience of users (e.g., dropped video frames) of a radio access network may be decreased— e.g., because the reconfigurable surface may be configured to improve a quality of communications associated with services that are susceptible to packet failures, such as low latency communications, rather than communications associated with services that are resistant to packet failures. Improving a quality of communications associated with services that are susceptible to packet failures may also increase throughput of a radio access network—e.g., by reducing retransmissions of such communications.

Aspects of the disclosure are initially described in the context of wireless communications systems. Aspects of the disclosure are also described in the context of resource diagrams and process flows. Aspects of the disclosure are further illustrated by and described with reference to apparatus diagrams, system diagrams, and flowcharts that relate to managing conflicting configurations for configuring a reflective surface.

FIG. 1 illustrates an example of a wireless communications system 100 that supports managing conflicting configurations for configuring a reflective surface in accordance with one or more aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol), which may also be referred to as a sidelink. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHz.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHz-300 GHz). Each of these higher frequency bands falls within the EHF band.

With the above aspects in mind, unless specifically stated otherwise, it should be understood that the term "sub-6 GHZ" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A wireless communications system 100 may increase throughput by using beamforming techniques, where a base station 105 may be configured to transmit to individual or groups of UEs 115 using dedicated beams. In some examples, the beamforming techniques include using active antenna units (or arrays of active antenna units) that form beams in one or more directions with high gain. In some examples, a coverage area of a base station 105 that uses beamforming techniques may be reduced relative to a base station 105 that does not use beamforming techniques. Also, such base stations 105 may be more susceptible to blockages within a coverage area (e.g., blockages that are in a path of a beam) than base stations 105 that do not use beamforming techniques. Additionally, to support the formation of narrow beams and the reception of multiple beams from different directions, base stations 105 that use beamforming techniques may use higher frequencies than base stations 105 that do not use beamforming techniques. For example, base station 105 that use beamforming techniques may perform communications in the Gigahertz or sub-Terahertz range.

A radio access network that includes base stations 105 that use beamforming techniques may include a larger quantity of base stations 105 than a radio access network that does not include base stations 105 that use beamforming techniques e.g., based on the smaller coverage areas and higher frequencies associated with the base stations 105 that use beamforming techniques. Also, in some examples, a radio access network that includes base stations 105 that use beamforming techniques may use more power than a radio access network that does not include base stations 105 that use beamforming techniques—e.g., based on the additional base stations 105 and active antennas used to form the beams.

To increase a coverage area of a radio access network that includes base stations 105 that use beamforming techniques with a reduced quantity of base stations and with minimal power increase, reconfigurable surfaces may be incorporated into the radio access network. Reconfigurable surfaces may be radio frequency (RF) reflective surfaces that include an array of reflective elements, where a reflectivity of the reconfigurable surface (which may be represented by Q) may be based on reflection coefficients configured for the reflective elements. A reconfigurable intelligent surface (RIS) may be, or be included in, an RIS system 117, where an RIS system 117 may also include a controller for configuring the reconfigurable surface.

In some examples, a base station 105 may be coupled with an RIS system 117 (e.g., by a wired link), where the reconfigurable surface may be positioned in a different geographic region than the base station 105 (e.g., meters away from the base station 105). The reconfigurable surface may provide a path around a blockage between a base station 105 and UE 115 (e.g., by way of reflection). In some examples, the base station 105 may send a message to the RIS system 117 instructing the RIS system 117 to configure the reflective elements of the reconfigurable surface (e.g., by modifying the reflection coefficients of the reflection elements) so that $\varphi$ is equal to a desired value. After sending the message to the RIS system 117, the base station 105 may form a beam in the direction of the reconfigurable surface so that the reflection of the beam off of the reconfigurable surface will be directed toward an intended UE 115.

To increase a utilization of reconfigurable surfaces in a radio access network, RIS systems 117 may be configured to support the reception of configurations from multiple devices over multiple links (e.g., wired links, wireless links, or both). Thus, multiple types of devices (e.g., base stations, UEs or both) may be able to control a reconfigurable surface via multiple links. Also, an angle of reflection of a reconfigurable surface may be adapted based on a configuration received from a first communications device to support communications for the first communications device during a first interval and readapted based on a configuration received from a second communications device to support communications for the second communications device during a second interval during a second interval. When an RIS system 117 is enabled to receive configurations from multiple devices, a controller of the reconfigurable surface may receive conflicting configurations from two or more devices but may be able to implement only one of the configurations. Procedures for resolving conflicts between configurations may not be established, and thus, neither of the configurations may be implemented by the reconfigurable surface.

To support the processing of multiple configurations to configure a reconfigurable surface that are received from multiple devices over multiple links (e.g., a wired or wireless link), procedures for prioritizing the configurations may be established. In some examples, a communications manager of a device (e.g., base station communications manager 106 or UE communications manager 116) transmits, to an RIS system 117, a message indicating a set of reflection coefficients (e.g., one or more reflection coefficients) and a priority of a communication associated with the set of reflection coefficients. In some examples, one or more additional devices may transmit similar messages to the RIS system 117—e.g., before, concurrently with, or after the device transmits the message.

A communications manager of the RIS system 117 (e.g., RIS communications manager 118) may receive the message transmitted by the device. In some examples, the RIS communications manager 118 may also receive one or more messages from one or more additional devices. In some examples, the messages received at the RIS system 117 may conflict with one another—e.g., configuring one set of reflection coefficients indicated by one message may be incompatible with configuring another set of reflection coefficients indicated by another message. In some examples, when conflicting messages are received, the RIS communications manager 118 determines priorities of the conflicting messages and applies the set of reflection coefficients indicated in the message associated with the highest priority communications.

By indicating priority information in a message indicating reflection coefficients, a controller of a reconfigurable surface may be able to use the message to determine which reflection coefficients to apply. By determining which reflection coefficient to apply to a reconfigurable surface based on priority information included in the messages, the controller may configure the reconfigurable surface to support the highest priority communications. By configuring the reconfigurable surface in favor of the highest priority communications, disruptions of an experience of users (e.g., dropped video frames) of a radio access network may be decreased—e.g., because the reconfigurable surface may be configured to improve a quality of communications associated with services that are susceptible to packet failures, such as low latency communications, rather than communications associated with services that are resistant to packet failures. Improving a quality of communications associated with services that are susceptible to packet failures may also increase throughput of a radio access network—e.g., by reducing retransmissions of such communications.

Figures 2A, 2B:
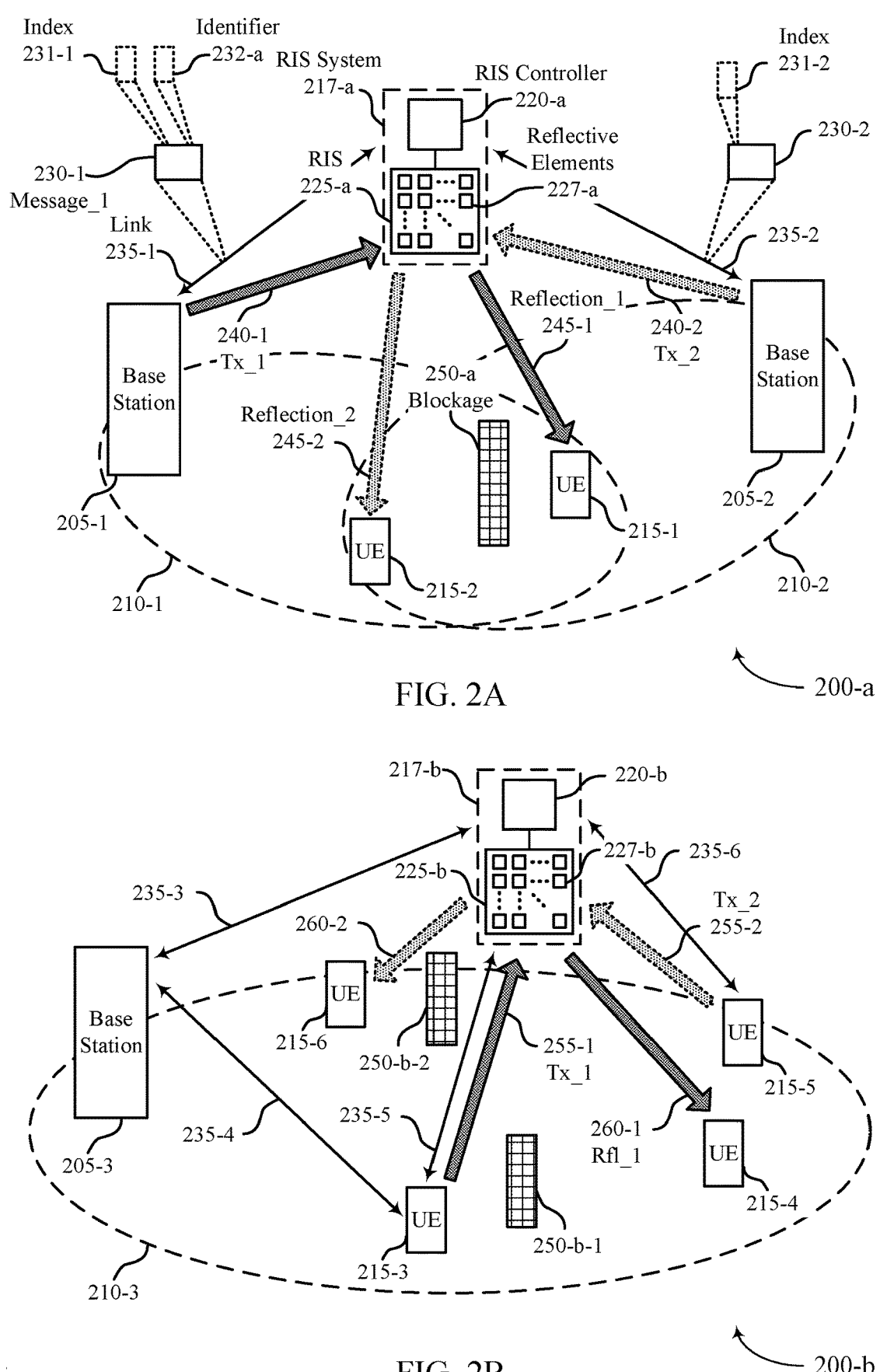
FIGS. 2A and 2B illustrate examples of wireless communications subsystems that support managing conflicting configurations for configuring a reflective surface in accordance with one or more aspects of the present disclosure.

FIG. 2A illustrates an example of a wireless communications subsystem that supports managing conflicting configurations for configuring a reflective surface in accordance with one or more aspects of the present disclosure.

Wireless communications subsystem 200-a depicts first base station 205-1, second base station 205-2, first UE 215-1, second UE 215-2, and RIS system 217-a, which may be respective examples of a base station, UE, or RIS system described with reference to FIG. 1. First base station 205-1, second base station 205-2, first UE 215-1, second UE 215-2, and RIS system 217-a may communicate with one another within coverage areas 210 using one or more of the techniques described in FIG. 1. First base station 205-1 may communicate with RIS controller 220-a via first link 235-1. Second base station 205-2 may communicate with RIS controller 220-a via second link 235-2. First link 235-1 and second link 235-2 may be wired links, wireless links, or a combination thereof.

RIS system 217-a may be configured to reflect transmissions from one device to another device—e.g., based on configuring reflective elements 227-a of RIS 225-a so that a transmission to RIS 225-a is reflected in a direction of an intended device. RIS system 217-a may include RIS controller 220-a and RIS 225-a.

RIS controller 220-a may be configured to configure reflective elements 227-a of RIS 225-a so that a desired angle of reflection (which may be represented by Q) from the RIS 225-a is achieved. In some examples, RIS controller 220-a may receive messages from one or more devices (e.g., base stations or UEs). In some examples, the messages include configurations to apply respective sets of reflection coefficients to RIS 225-a to achieve desired angles of reflection. In some examples, the messages include requests to train a beam of RIS 225-a in the direction of another device. For example, first base station 205-1 may send a request for RIS controller 220-a to train a beam of RIS 225-a in a direction of first UE 215-1, and second base station 205-2 may train a beam of RIS 225-a in a direction of second UE 215-2. The messages may also include an indication of a priority of respective communications associated with the respective sets of reflection coefficients. RIS controller 220-a may determine which set of reflection coefficients to apply to (or which training sequence to execute for) RIS 225-a based on the priority information.

RIS 225-a may include one or more RF reflective elements 217-a. In some examples, RIS 225-a may be referred to as a reconfigurable surface. In some examples, each reflective element 227-a may be configured to apply a phase (or, in some examples, a phase and amplitude) shift to a received signal, where an angle of reflection for the received signal at the reflective element 227-a is based on the applied phase (and, in some examples, amplitude) shift. A reflection coefficient of a reflective element 224-a may be based on the degree of the phase (or phase and amplitude) shift applied by a reflective element 227-a. In some examples, the reflective elements 227-a are passive components, where the reflection coefficient of a reflective element 227-a may be semi-statically changed—e.g., by RIS controller 220-a. Together, the reflective elements 227-a of RIS 225-a may be used to form a beam (which may be referred to as a reflection beam) based on a set of reflection coefficients applied to the reflective elements 227-a. A direction of the beam may be based on the reflection coefficients. Also, a direction of the beam may be changed based on adapting the reflection coefficients. An energy of reflections of signals received at RIS 225-a may be concentrated within the reflection beam formed by the reflective elements 227-a.

In some examples, first base station 205-1 may establish a connection with first UE 215-1, and second base station 205-2 may establish a connection with second UE 215-2. In some examples, blockage 250-a may disrupt communications between first base station 205-1 and first UE 215-1. Blockage 250-a may also disrupt communications between second base station 205-2 and second UE 215-2.

In some examples, to mitigate the effect of blockage 250-a, first base station 205-1 may use RIS 225-a to communicate with first UE 215-1. In such cases, first base station 205-1 may send first message 230-1 to RIS 225-a instructing RIS 225-a to configure a set of reflection coefficients that will result in transmissions from first base station 205-1 being reflected to first UE 215-1, and vice versa. Similarly, to mitigate the effect of blockage 250-a, second base station 205-2 may use RIS 225-a to communicate with second UE 215-2. In such cases, second base station 205-2 may send second message 230-2 to RIS 225-a instructing RIS 225-a to configure a set of reflection coefficients that will result in transmissions from second base station 205-2 being reflected to second UE 215-2, and vice versa.

In some examples, the messages 230 may each include values for the sets of reflection coefficients. In other examples, the messages 230 may each include an index associated with a respective set of reflection coefficients (e.g., first message 230-1 may include first index 231-1 and second message 230-2 may include second index 231-2). Additionally, the messages 230 may include an indication of a priority of a communication associated with the indicated set of reflection coefficients—e.g., first message 230-1 may indicate a priority of communications included in first transmission 240-1 to first UE 215-1, and second message 230-2 may indicate a priority of communications included in second transmission 240-2 to second UE 215-2.

In some examples, RIS controller 220-a configures RIS 225-a based on the set of reflection coefficients indicated in first message 230-1. In such cases, first base station 205-1 may transmit first transmission 240-1 to RIS 225-a, and first reflection 245-1 of first transmission 240-1 may be directed toward first UE 215-1 via RIS 225-a. In some examples, first base station 205-1 determines beam coefficients for first transmission 240-1 based on the reflection coefficients indicated to RIS 225-a—e.g., so that an angle of arrival of first transmission 240-1 at RIS 225-a results in first reflection 245-1 being directed toward first UE 215-1. In other examples, RIS controller 220-a configures RIS 225-a based on the set of reflection coefficients indicated in second message 230-2, and second base station 205-2 similarly transmits second transmission 240-2 to second UE 215-2 via RIS 225-a using second reflection 245-2.

In some examples, first base station 205-1 and second base station 205-2 may seek to configure RIS 225-a with different sets of reflection coefficients at a same time—e.g., when concurrent communications are scheduled for first UE 215-1 and second UE 215-2. In such cases, RIS controller 220-a may determine which set of reflection coefficients to apply to RIS 225-a. RIS controller 220-a may determine which set of reflection coefficients to apply based on a priority of the communications associated with the different sets of reflection coefficients—e.g., RIS controller 220-a may configure the set of reflection coefficients for RIS 225-a associated with the higher priority.

Figure 4:
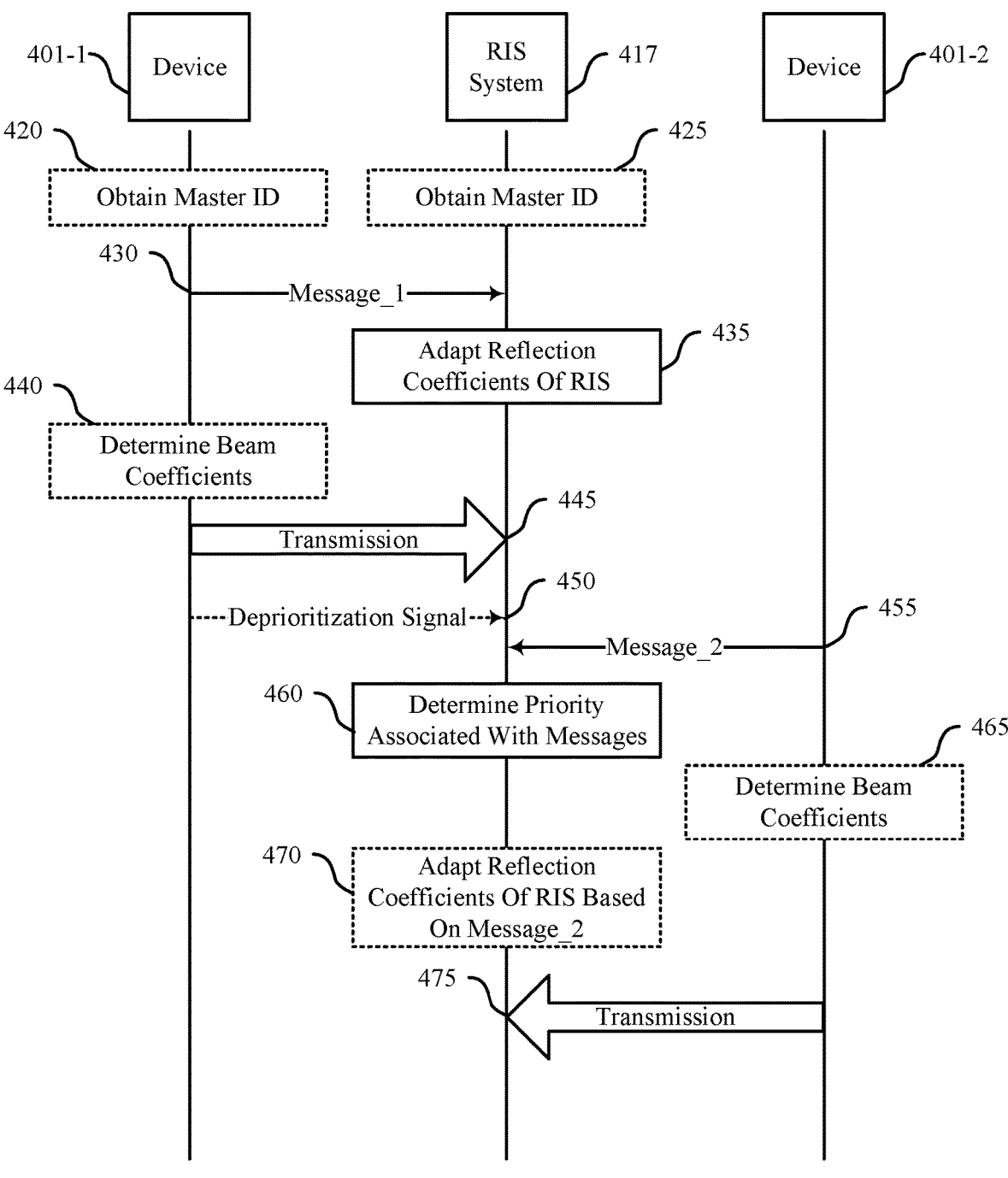
FIGS. 4 through 6 illustrates example sets of operations that support managing conflicting configurations for configuring a reflective surface in accordance with one or more aspects of the present disclosure.
Figure 5:
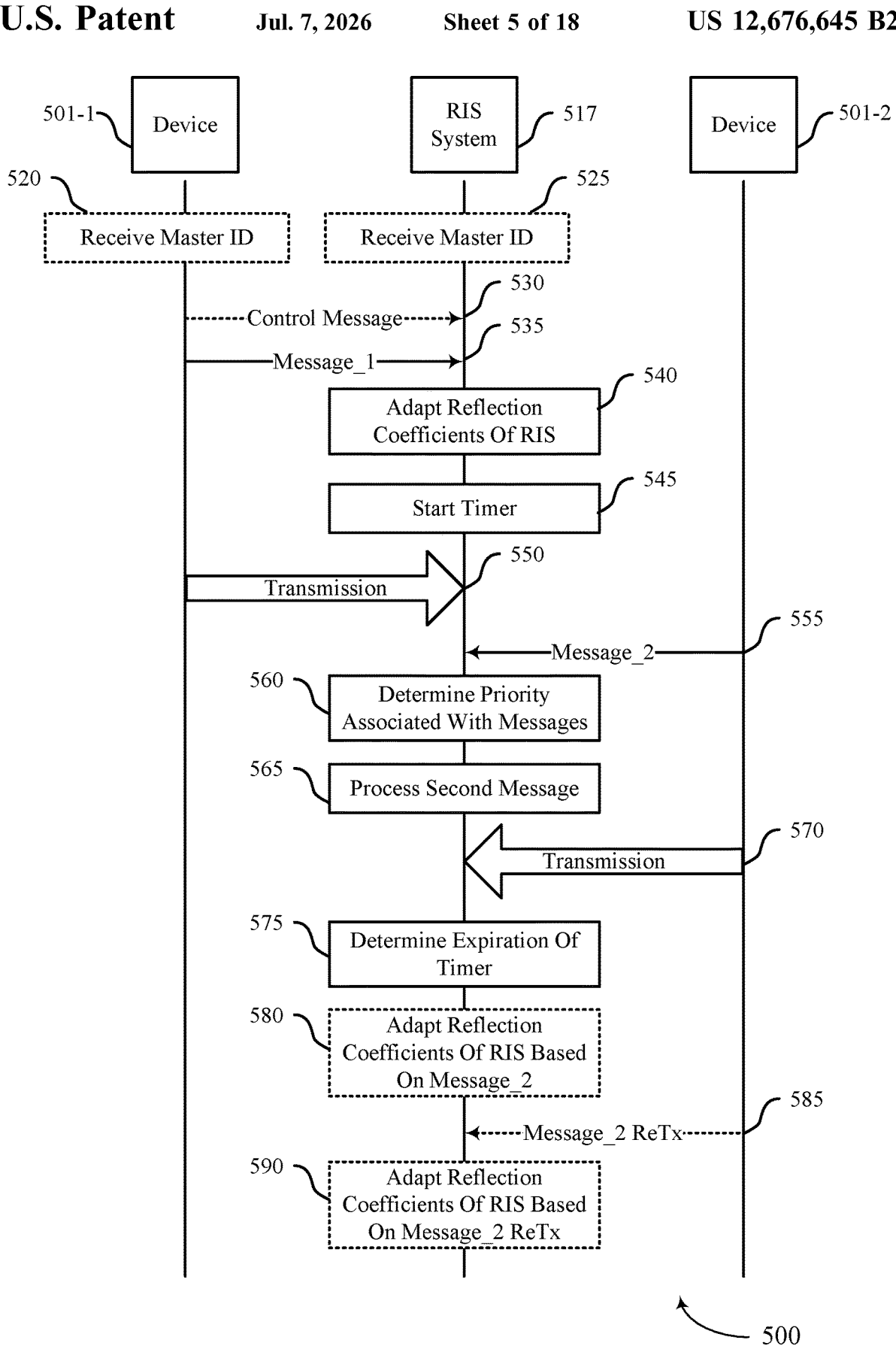
Figure 6:
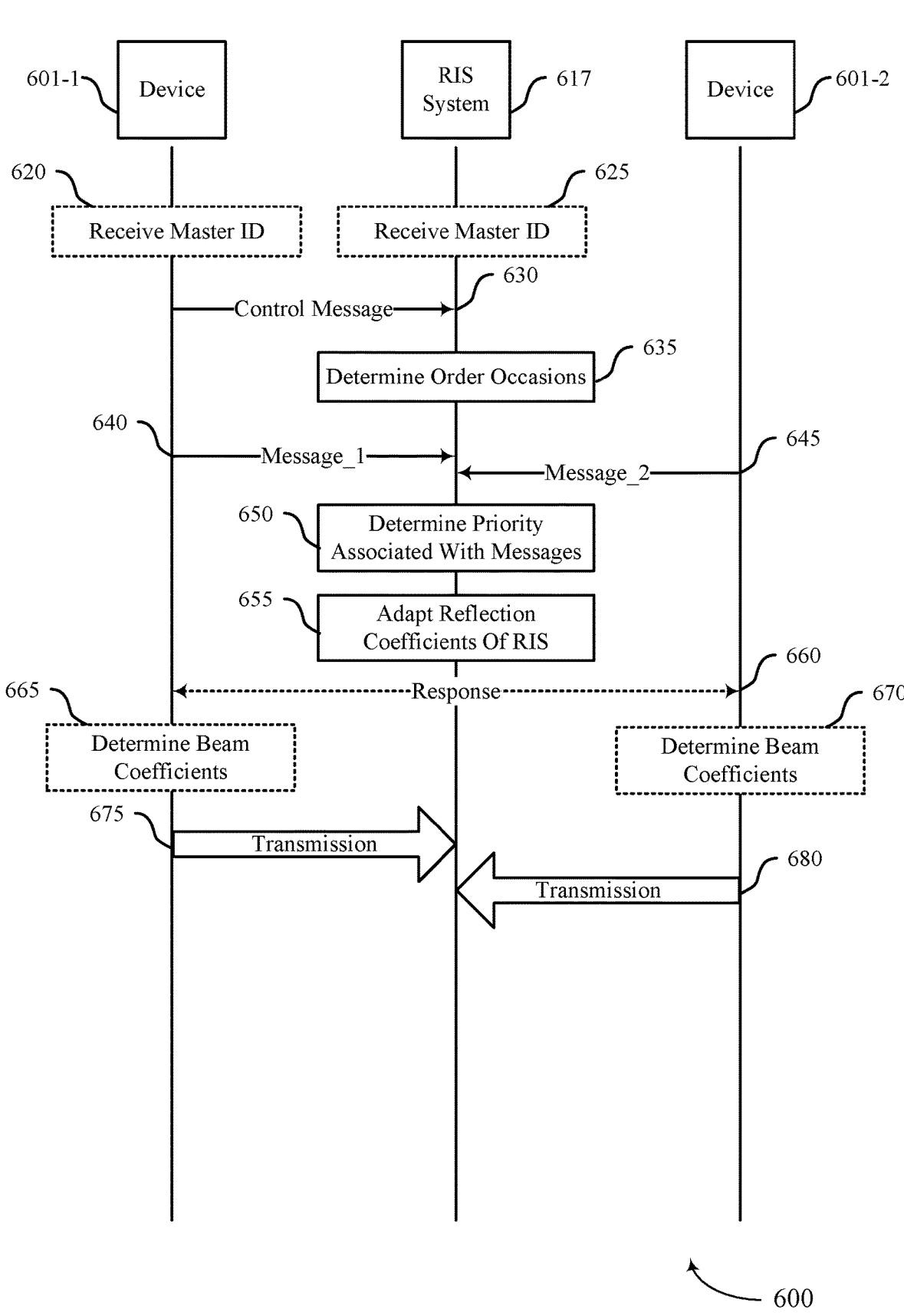

In some examples, one of the base stations may be assigned a master identifier, and RIS controller 220-a may select the set of reflection coefficients received from the master base station or use the identifier as a tie breaker if two base stations are associated with communications of the same priority, as described in more detail herein and with reference to FIGS. 4 through 6. Base station 205-1 may include identifier 232 in first message 230-1 to indicate to RIS system 217-a an identity of a device that has been assigned a role for resolving conflicts between configurations received from different devices that have common priority levels.

In some examples, RIS controller 220-a may configure a set of reflection coefficients for RIS 225-a after receiving a message 230 associated with a first communication and reconfigure the set of reflection coefficients for RIS 225-a after receiving a message 230 associated with a second communication that has a higher priority than the first communications, as described with reference to FIG. 4.

In some examples, RIS controller 220-a may start a timer after configuring a first set of reflection coefficients received in a first message for RIS 225-a. In some examples, after starting the timer, RIS controller 220-a may discard messages 230 received before the timer expires. In other examples, RIS controller 220-a may buffer messages 230 received before the timer expires and configure RIS 225-a based on the buffered messages 230 (e.g., the highest priority message 230) after the timer expires. In some examples, RIS controller 220-a may reconfigure RIS 225-a if a message 230 is received while the timer is running that has a higher priority than the first message. Additional details regarding using a timer are described herein and with reference to FIG. 5.

Figure 3:
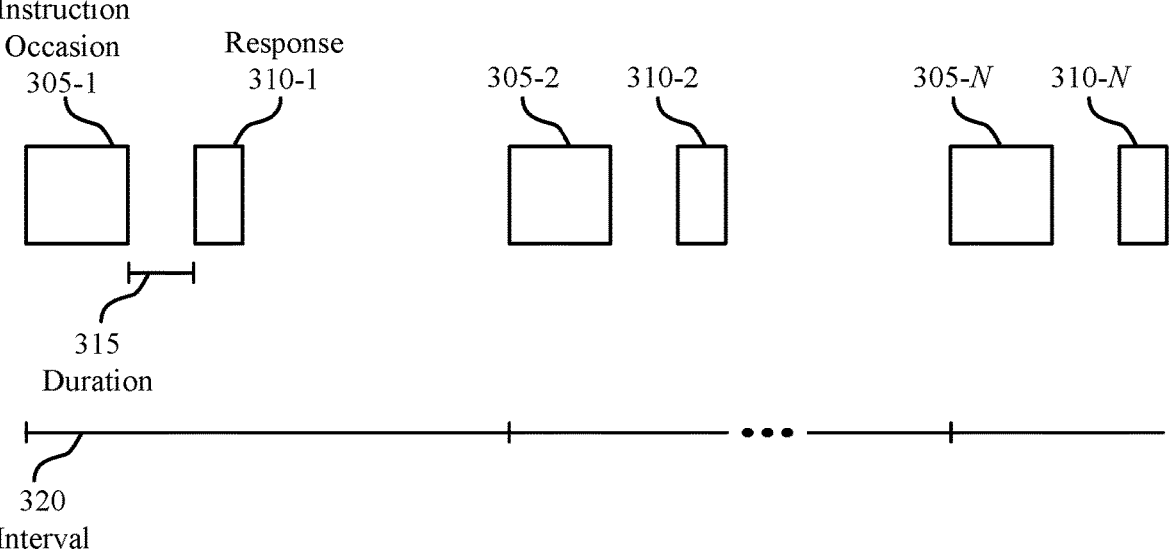
FIG. 3 illustrates an example of a diagram that supports managing conflicting configurations for configuring a reflective surface in accordance with one or more aspects of the present disclosure.

In some examples, RIS 225-a may receive messages 230 during a configuration occasion, and RIS controller 220-a may indicate in a response which set of reflection coefficients has been configured, as described in more detail herein and with reference to FIGS. 3 and 6.

FIG. 2B illustrates an example of a wireless communications subsystem that supports managing conflicting configurations for configuring a reflective surface in accordance with one or more aspects of the present disclosure.

Wireless communications subsystem 200-b depicts third base station 205-3, third UE 215-3, fourth UE 215-4, fifth UE 215-5, sixth UE 215-6, and RIS system 217-b, which may be respective examples of a base station, UE, or RIS described with reference to FIG. 1. Third base station 205-3, third UE 215-3, fourth UE 215-4, fifth UE 215-5, sixth UE 215-6, and RIS system 217-b may communicate with one another within third coverage area 210-3 using one or more of the techniques described in FIG. 1. RIS system 217-b may be similarly configured as RIS system 217-a. Third link 235-3 may be a wired or wireless link. Fourth link 235-4, fifth link 235-5, and sixth link 235-6 may be wireless links.

In FIG. 2B, UEs may also be capable of using RIS 225-b to communicate with one another—e.g., using D2D communications and using sidelink resources scheduled by third base station 205-3. In some examples, to avoid first blockage 250-b-1, third UE 215-3 may use RIS 225-b to communicate with fourth UE 215-4, where RIS 225-b may be used to direct first reflection 260-1 of first transmission 255-1 toward fourth UE 215-4. Similarly, to avoid second blockage 250-b-2, fifth UE 215-5 may use RIS 225-b to communicate with sixth UE 215-6, where RIS 225-b may be used to direct second reflection 260-2 of second transmission 255-2 toward sixth UE 215-6. The UEs 215 may send messages 230 to RIS controller 220-b requesting that a set of reflection coefficients be configured at RIS 225-b. The UEs 215 may also send messages 230 requesting RIS controller 220-b train a beam of RIS 225-b in a direction of another UE 215. For example, third UE 215-3 may send a request for RIS controller 220-b to train a beam of RIS 225-b in a direction of fourth UE 215-4, and fifth UE 215-5 may send a request for RIS controller 220-*b* to train a beam of RIS 220-*b* in a direction of sixth UE 215-6. RIS controller 220-*b* may determine which set of reflection coefficients to apply (or which training sequence to execute) based on a priority of communications associated with the different messages 230 received from the different UEs 215 (and in some examples from base stations 205), as similarly described with reference to FIG. 2A.

In some examples, third base station 205-3 assigns a master identifier to third UE 215-3 via fourth link 235-4 and indicates the master identifier to RIS controller 220-*b* via third link 235-3. In some examples, RIS controller 220-*b* may request that third UE 215-3 select between sets of reflection coefficients requested by different UEs 215 based on third UE 215-3 being assigned the master identifier— e.g., when the sets of reflection coefficients are associated with communications of a same priority.

FIG. 3 illustrates an example of a diagram that supports managing conflicting configurations for configuring a reflective surface in accordance with one or more aspects of the present disclosure.

Diagram 300 depicts communication resources associated with receiving messages for indicating reflection coefficients and for transmitting responses for indicating a selected set of reflection coefficients. Diagram 300 may depict configuration occasions 305 and response resources 310.

Configuration occasions 305 may include a set of communication resources designated for receiving, at a controller (e.g., an RIS controller 220 of FIG. 2A or 2B) of a reconfigurable surface (e.g., an RIS 225 of FIG. 2A or 2B), messages for requesting the configuration of reflection coefficients for the reconfigurable surface. Configuration occasions 305 may be separated from one another by an interval (e.g., interval 320). In some examples, configuration occasions 305 may be scheduled on a periodic basis.

Response resources 310 may occur after corresponding configuration occasions 305. In some examples, a response resource is separated from a corresponding configuration occasion by a predetermined duration (e.g., duration 315). Response resources 310 may include a set of communication resources designated for transmitting, from a controller of a reconfigurable surface, a message indicating which set of reflection coefficients have been configured for the reconfigurable surface.

In some examples, a controller receives messages from one or more devices during first configuration occasion 305-1. Each message received by the controller may request that a respective set of reflection coefficients be configured for the reconfigurable surface. In some examples, each of the messages indicates a different set of reflection coefficients. In other examples, one or more of the messages indicates a same set of reflection coefficients. In some examples, the messages may each include values for the respective set of reflection coefficients. In some examples, the messages may each include an index associated with the respective set of reflection coefficients. Each message may also include an indication of a priority of communications associated with a set of reflection coefficients indicated in a message.

The controller may determine which set of reflection coefficients to apply for the reconfigurable surface based at least in part on the priority information included in the messages. In some examples, the controller selects the set of reflection coefficients received in the message that indicates the highest priority communication. In other examples, the controller selects the set of reflection coefficients received in a largest quantity of messages—e.g., if a same set of reflection coefficients is received in multiple messages. In some examples, the controller may select a set of reflection coefficients received in a message that also includes a master identifier—e.g., when the message is associated with communications of a same priority as another message received at the controller. In some examples, the controller may request that a master device select a set of reflection coefficients—e.g., when multiple messages that are associated with communications of a same priority are received at the controller. Additional techniques for determining which set of reflection coefficients to apply are described herein.

After selecting a set of reflection coefficients, the controller may apply the set of reflection coefficients for the reconfigurable surface. In some examples, the selected set of reflection coefficients are applied at least until an expiration of interval 320. The controller may also transmit, in first response resources 310-1, an indication of which set of reflection coefficients were selected. In some examples, the controller may transmit an identifier associated with the device (or, in some examples, the one or more devices) that requested the set of reflection coefficients selected by the controller. In other examples, the controller may transmit an index associated with the set of reflection coefficients selected by the controller.

The controller may similarly receive additional messages in the following configuration occasions 305 and select a same or new set of reflection coefficients for the reconfigurable surface based on the additional messages.

In some examples, configuration occasions may not be periodically scheduled. In such cases, the controller may respond to each message received from different devices (e.g., with an ACK/NACK response) to indicate whether the set of reflection coefficients were selected for the RIS—e.g., after waiting for a duration, such as duration 315.

FIG. 4 illustrates an example of a set of operations that supports managing conflicting configurations for configuring a reflective surface in accordance with one or more aspects of the present disclosure.

Process flow 400 may be performed by first device 401-1, second device 401-2, and RIS system 417. First device 401-1 and second device 401-2 may be examples of base stations or UEs as described with reference to FIGS. 1 and 2. In some examples, first device 401-1 may be an example of a base station and second device 401-2 may be an example of a UE, or vice versa. RIS system 417 may be an example of an RIS system described with reference to FIGS. 1 and 2.

In some examples, process flow 400 illustrates an exemplary sequence of operations performed to support managing conflicting configurations for configuring a reflective surface. For example, process flow 400 depicts operations for determining which set of reflection coefficients to apply to a reconfigurable surface based on received priority information.

It is understood that one or more of the operations described in process flow 400 may be performed earlier or later in the process, omitted, replaced, supplemented, or performed in combination with another operation. Also, additional operations described herein that are not included in process flow 400 may be included.

At 420, first device 401-1 may obtain a master identifier. In some examples, first device 401-1 may be assigned the master identifier by a core network—e.g., when first device 401-1 is a base station. In some examples, first device 401-1 may be assigned the master identifier by a base station using control signaling, such as radio resource control (RRC), medium access control (MAC) layer, or downlink control information (DCI) signaling—e.g., when first device 401-1 is a UE. In some examples, the master identifier is used to indicate a master device for sidelink communications.

At 425, RIS system 417 may obtain the master identifier. In some examples, RIS system 417 receives the master identifier from a base station in RRC, MAC layer, or DCI signaling.

At 430, first device 401-1 may transmit a first message to RIS system 417 (e.g., via a wireless link). The first message may include an indication of a first set of reflection coefficients and an indication of a priority of first communications for which the first set of reflection coefficients will support. In some examples, the first message may include an application being served by first device 401-1 (e.g., a URLLC or enhanced mobile broadband (eMBB) service) and a quality of service associated with communications that support the application. In some examples, the indication of the priority in the first message includes characteristics of the first communications, including an application associated with the first communications, a quality of service associated with the first communications, a quantity of devices served by first device 401-1 (which may be a soft quality of service metric), an amount of data scheduled to be communicated by the first communications in a time period, traffic statistics associated with a service provided by the first device, a duration associated with completing the first communications, or any combination thereof. The traffic statistics may represent the amount of time a particular service (e.g., URLLC service) is used by first device 401-1. In some examples, RIS system 417 may determine a priority associated with the first message based on the characteristics included in the first message.

In some examples, the first message may include a value that indicates the priority of the first communications. In such cases, first device 401-1 may generate the value based on the above characteristics and transmit the value in the first message to indicate the priority of the first communications associated with the first set of reflection coefficients. In some examples, RIS system 417 may determine a priority associated with the first message based on the value included in the first message.

In some examples, first message 430 is transmitted RIS system 417 using RRC signaling, a MAC-control element (MAC-CE), sidelink RRC signaling, a sidelink MAC-CE, downlink control information, or sidelink control information.

At 435, RIS system 417 may adapt the reflection coefficients configured for the RIS based on the first message. In some examples, RIS system 417 applies the first set of reflection coefficients received in the first message to the reflective elements of the RIS. In some examples, RIS system 417 applies the first set of reflection coefficients received in the first message to the reflective elements of the RIS for at least the duration associated with completing the first communications and indicated in the first message.

At 440, first device 401-1 may determine a precoding matrix (which may include determining beam coefficients) for transmitting signals associated with the first communications. First device 401-1 may determine the beam coefficients based on the first set of reflection coefficients indicated in the first message. In some examples, first device 401-1 selects the beam coefficients under the assumption that RIS system 417 will apply the first set of reflection coefficients indicated in the first message, where the beam coefficients are selected so that energy of the reflection is increased at a position of an intended receiving device.

At 445, first device 401-1 may perform a transmission—e.g., using the determined beam coefficients. In some examples, first device 401-1 forms a transmission beam based on the determined beam coefficients and transmits a beam signal to RIS system 417 in accordance with the transmission beam. The RIS of RIS system 417 may be used to form a reflection of the beam signal, where the reflected signal may be directed toward the intended receiving device.

At 450, first device 401-1 may send a deprioritization signal indicating that a priority level associated with the first communications supported by the first set of reflection coefficients has been downgraded. In some examples, the deprioritization signal is used to indicate that first device 401-1 is no longer using RIS system 417—e.g., if a blockage is removed from a communication path. In some examples, first device 401-1 sends the deprioritization signal if all of the first communications associated with a high priority service are completed.

At 455, second device 401-2 may transmit a second message to RIS system 417. The second message may include an indication of a second set of reflection coefficients and an indication of a priority of second communications for which the second set of reflection coefficients will support, as similarly described with reference to the first message.

At 460, RIS system 417 may determine a second priority associated with the second message and compare the second priority of the second message with the first priority of the first message. In some examples, RIS system 417 may determine the first priority indicated in the first message is higher than the second priority indicated in the second message. In other examples, RIS system 417 may determine the first priority indicated in the first message is lower than the second priority indicated in the second message. In some examples, RIS system 417 may determine the first priority associated with first communications performed by first device 401-1 is lower than the second priority associated with second communications performed by second device 401-2 even though the first priority indicated in the first message is the same or higher than the second priority indicated in the second message—e.g., if first device 401-1 transmits the deprioritization signal to RIS system 417.

In some examples, RIS system 417 may determine that the first priority indicated in the first message is higher than the second priority in the second message based on the first message indicating a URLLC service and the second message indicating an eMBB service. In some examples, RIS system 417 may determine that the first priority indicated in the first message is higher than the second priority in the second message based on the first message indicating that first device 401-1 serves more node or packets than second device 401-2. In some examples, RIS system 417 may determine that the second priority indicating in the second message is higher than the first priority indicated in the second message, but wait until a time associated with completing a communication received in the first message expires before configuring the second set of reflection coefficients.

In some examples, RIS system 417 may determine that the second priority and the first priority are equivalent. In such cases, if a master identifier is used, the RIS system 417 may determine that the first priority is higher than the second priority based on the master identifier being included in the first message. In other cases, the RIS system 417 may transmit a message to a master device (e.g., when neither first device 401-1 or second device 401-2 are the master device) requesting the master device to resolve whether the first set of coefficients or the second set of coefficients should be applied to the RIS. The master device may respond with a message indicating which set of coefficients should be applied—e.g., based on information regarding the first device 401-1 or second device 401-2 that is stored at the master device.

At 465, second device 401-2 may determine a precoding matrix (which may include determining beam coefficients) for transmitting signals associated with the second communications. Second device 401-2 may determine the beam coefficients based on the second set of reflection coefficients indicated in the second message. In some examples, second device 401-2 selects the beam coefficients under the assumption that RIS system 417 will apply the second set of reflection coefficients indicated in the first message, where the beam coefficients are selected so that energy of the reflection is increased at a position of an intended receiving device.

At 470, RIS system 417 may adapt the reflection coefficients configured for the RIS based on the second message—e.g., if RIS system 417 determines that the priority of the second communications from second device 401-2 is higher than the priority of the first communications from first device 401-1. In some examples, if RIS system 417 determines that the priority of the second communications from second device 401-2 is lower than the priority of the first communications from first device 401-1, RIS system 417 may continue to apply the first set of reflection coefficients to the RIS.

At 475, second device 401-2 may perform a transmission—e.g., using the determined beam coefficients. In some examples, second device 401-2 forms a transmission beam based on the determined beam coefficients and transmits a beam signal to RIS system 417 in accordance with the transmission beam. When the RIS system 417 configures the second set of reflection coefficients for the RIS, the RIS of RIS system 417 may be used to form a reflection of the beam signal, where the reflected signal may be directed toward an intended receiving device.

When the RIS system 417 maintains the first set of reflection coefficients for the RIS, the RIS of RIS system 417 may generate a reflected signal that is directed away from an intended receiving device. In such cases, the intended receiving device may still detect the reflected signal but with a lower signal quality than if the second set of reflection coefficients were applied to the RIS.

FIG. 5 illustrates an example of a set of operations that supports that supports managing conflicting configurations for configuring a reflective surface in accordance with one or more aspects of the present disclosure.

Process flow 500 may be performed by first device 501-1, second device 501-2, and RIS system 517. First device 501-1 and second device 501-2 may be examples of base stations or UEs as described with reference to FIGS. 1 and 2. In some examples, first device 501-1 may be an example of a base station and second device 501-2 may be an example of a UE, or vice versa. RIS system 517 may be an example of an RIS system described with reference to FIGS. 1 and 2.

In some examples, process flow 500 illustrates an exemplary sequence of operations performed to support managing conflicting configurations for configuring a reflective surface. For example, process flow 500 depicts operations for handling configurations received after applying a set of reflection coefficients to a reconfigurable surface while a timer associated with applying the set of reflection coefficients is running.

It is understood that one or more of the operations described in process flow 500 may be performed earlier or later in the process, omitted, replaced, supplemented, or performed in combination with another operation. Also, additional operations described herein that are not included in process flow 500 may be included.

At 520, a master identifier may be obtained at first device 501-1, as similarly described with reference to the operations described at 420 of FIG. 4. At 525, a master identifier may be obtained at RIS system 517, as similarly described with reference to the operations described at 425 of FIG. 4.

At 530, first device 501-1 may transmit a control message (e.g., in RRC signaling, a MAC-CE, or DCI) to RIS system 517. The control message may indicate a duration of a timer associated with configuring reflection coefficients for an RIS. In some examples, the duration of the timer is predetermined, and RIS system 517 does not receive the duration of the timer in control signaling.

At 535, first device 501-1 may transmit a first message to RIS system 517, as similarly described with reference to the operations described at 430 of FIG. 4. At 540, RIS system 517 may adapt reflection coefficients of the RIS based on the first message, as similarly described with reference to the operations described at 435 of FIG. 4.

At 545, RIS system 517 may start a timer based on adapting the reflection coefficients of the RIS. The timer may be associated with a duration during which messages received from other devices requesting a set of reflection coefficients may be ignored or buffered—e.g., if the messages are of a lower priority than communications associated with the first message.

At 550, first device 501-1 may transmit a beam signal in a direction of the RIS, as similarly described with reference to the operations described at 440 and 445 of FIG. 4. At 555, RIS system 517 may receive a second message from second device as similarly described with reference to the operations described at 455 of FIG. 4. At 560, RIS system 517 may determine a priority associated with the messages, as similarly described with reference to the operations described at 460 of FIG. 4.

At 565, RIS system 517 may process the second message based on the determined priority information. In some examples, RIS system 517 may determine that a second priority associated with the second message is lower than a first priority associated with the first message. In some examples, RIS system 517 may ignore/discard the second message based on the second priority being lower than the first priority. In other examples, RIS system 517 may buffer the second message based on the second priority being lower than the second priority.

At 570, second device 501-2 may transmit a beam signal in a direction of the RIS, as similarly described with reference to the operations described at 465 and 475.

At 575, RIS system 517 may determine that the timer has expired. In some examples, at the expiration of the timer, RIS system 517 may determine whether any additional messages were received while the timer was running. In some examples, the RIS system 517 may determine respective priorities of the messages received while the timer was running and identify the message that is associated with the highest priority.

At 580, RIS system 517 may apply a second set of reflection coefficients received in the second message to the RIS—e.g., based on buffering the second message and determining that the second message is associated with a highest priority. In some examples, applying the second set of reflection coefficients to the RIS may improve a performance of the transmissions from second device 501-2, which may be ongoing.

At 585, second device 501-2 may retransmit the second message to RIS system 517. In some examples, the retransmission of the second message includes an indication that the second message is a retransmission, which may increase a priority indicated by the second message.

At 590, RIS system 517 may apply the second set of reflection coefficients to the RIS based on the retransmission of the second message—e.g., if RIS system 517 discarded messages received while the timer was running.

FIG. 6 illustrates an example of a set of operations that supports that supports managing conflicting configurations for configuring a reflective surface in accordance with one or more aspects of the present disclosure.

Process flow 600 may be performed by first device 601-1, second device 601-2, and RIS system 617. First device 601-1 and second device 601-2 may be examples of base stations or UEs as described with reference to FIGS. 1 and 2. In some examples, first device 601-1 may be an example of a base station and second device 601-2 may be an example of a UE, or vice versa. RIS system 617 may be an example of an RIS system described with reference to FIGS. 1 and 2.

In some examples, process flow 600 illustrates an exemplary sequence of operations performed to support managing conflicting configurations for configuring a reflective surface. For example, process flow 600 depicts operations for receiving configurations to apply sets of reflection coefficients to a reconfigurable surface during configuration occasions and for indicating the selected set of reflection coefficients.

It is understood that one or more of the operations described in process flow 600 may be performed earlier or later in the process, omitted, replaced, supplemented, or performed in combination with another operation. Also, additional operations described herein that are not included in process flow 600 may be included.

At 620, a master identifier may be obtained at first device 601-1, as similarly described with reference to the operations described at 420 of FIG. 4. At 625, a master identifier may be obtained at RIS system 617, as similarly described with reference to the operations described at 425 of FIG. 4.

At 630, first device 501-1 may transmit a control message (e.g., RRC signaling) to RIS system 517. The control message may indicate communication resources that are scheduled for receiving messages for configuring the reflection coefficients of the RIS and communications resources that are scheduled for transmitting an indication of a set of reflection coefficients selected by RIS system 617. In some examples, the control message includes an index of a communication resource for receiving the messages (which may be referred to as a configuration occasion) and a period with which communication resources for receiving the messages will repeat. The control message may also indicate a duration between an end of a configuration occasion and a beginning of a communication resource for indicating the selected set of reflection coefficients.

At 635, RIS system 617 may determine a position of configuration occasions based on the control message. In some examples, RIS system 617 may identify a particular communication resource based on the control message as a configuration and may identify other configuration occasions based on a periodic interval received in the control message. In some examples, first device 601-1 and second device 601-2 may similarly determine a position of the configuration occasions.

At 640, first device 601-1 may transmit a first message to RIS system 517, as similarly described with reference to the operations described at 430 of FIG. 4. At 645, second device 601-2 may transmit a second message to RIS system 517, as similarly described with reference to the operations described at 455 of FIG. 2.

At 650, RIS system 617 may determine priorities associated with the different messages, as similarly described with reference to the operations described at 460 of FIG. 4.

At 655, RIS system 617 may adapt the reflection coefficients applied to an RIS in accordance with a selected set of reflection coefficients based on the determined priority information, as described with reference to 460 of FIG. 4. In some examples, RIS system 617 will apply a new set of reflection coefficients if a message associated with a higher priority is received after applying the selected set of coefficients, as described with reference to FIG. 4. In some examples, RIS system 617 starts a timer after selecting the set of coefficients and applies the selected set of reflection coefficients until an expiration of the timer, as similarly described with reference to FIG. 5, ignoring or buffering any messages received while the timer is running.

At 660, RIS system 617 may transmit a response to first device 601-1 and second device 601-2 indicating which set of reflection coefficients were selected by RIS system 617 and are currently applied to the RIS. In some examples, the response is an ACK/NACK message. In some examples, the response includes an identifier of the device for which the selected set of reflection coefficients corresponds. For example, if RIS system 617 selects first device 601-1, RIS system 617 may include an identifier of first device 601-1 in the response. In such cases, first device 601-1 may receive the response and determine that the set of reflection coefficients indicated in the first message are applied to the RIS based on determining the signaled identifier matches an identifier of first device 601-1. And second device 601-2 may receive the response and determine that the set of reflection coefficients indicated in the second message are not applied to the RIS based on determining the signaled identifier is different than an identifier of second device 601-2.

In some examples, the response includes an identifier of the set of reflection coefficients applied to the RIS. For example, the response may include an index that corresponds to the selected set of reflection coefficients. In such cases, first device 601-1 and second device 601-2 may determine the set of reflection coefficients currently applied to the RIS based on the indicated index.

At 665, first device 601-1 may determine a precoding matrix (which may include determining beam coefficients) to form a transmission beam based on the response. In some examples, first device 601-1 selects the beam coefficients based on determining that the RIS system 617 selected the first set of reflection coefficients indicated in the first message—e.g., based on the response indicating an identifier of first device 601-1 or an index corresponding to the first set of reflection coefficient. In such cases, first device 601-1 may select the beam coefficients so that a reflected signal off of the RIS will have an increased energy in a vicinity of an intended receiving device.

In other examples, first device 601-1 selects the beam coefficients based on determining that the RIS system 617 selected a different set of reflection coefficients than those indicated in the first message. In some examples, first device 601-1 may be unable to determine the set of reflection coefficients selected by RIS system 617 based on the response—e.g., if the response doesn't indicate an index associated with a set of reflection coefficient. In such cases, first device 601-1 may select a set of beam coefficients that are compatible with a wider range of reflection coefficients at the RIS. In other examples, first device 601-1 may determine the set of reflection coefficients selected by RIS system 617 based on the response—e.g., if the response indicate a corresponding index. In such cases, first device 601-1 may select a set of beam coefficients based on the indicated set of reflection coefficients to improve an energy of the resulting reflected signal in a vicinity of the intended receiving device, though the energy of the resulting reflected signal may remain lower than if the first set of reflection coefficients included in the first message were selected.

At 670, second device 601-2 may determine a precoding matrix (which may include determining beam coefficients) for a transmission, as similarly described with reference to first device 601-1.

At 675, first device 601-1 may perform transmissions in accordance with the determined beam coefficients. At 680, second device 601-2 may perform transmissions in accordance with the determined beam coefficients. In some examples, first device 601-1 may delay transmissions until after a next configuration occasion if the first set of reflection coefficients is not selected by RIS system 617. Similarly, second device 601-2 may delay transmissions until after a next configuration occasion if the second set of reflection coefficients is not selected by RIS system 617.

Figure 7:
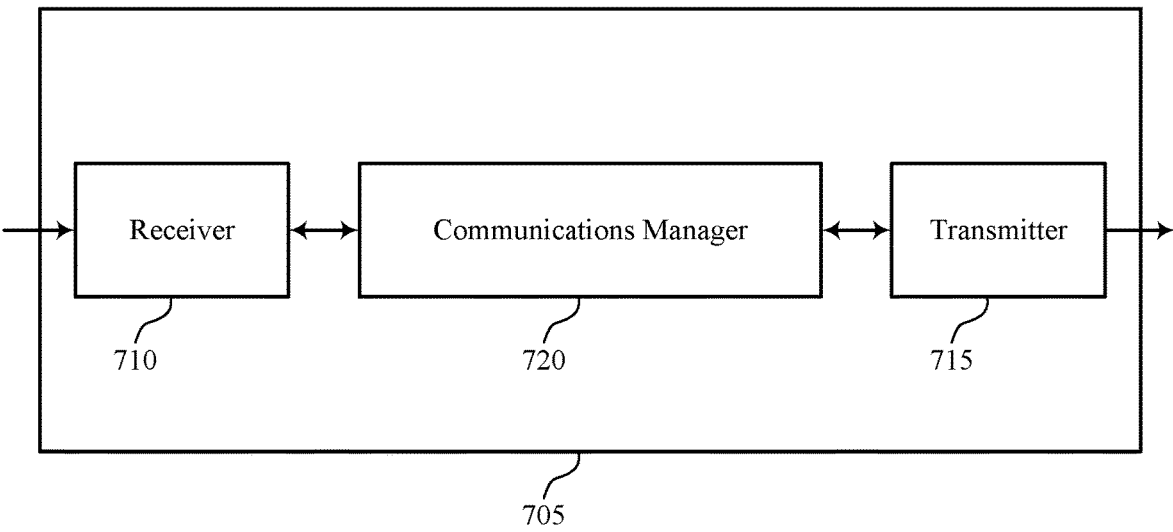
FIGS. 7 and 8 show block diagrams of devices that support managing conflicting configurations for configuring a reflective surface in accordance with one or more aspects of the present disclosure.

FIG. 7 shows a block diagram 700 of a device 705 that supports managing conflicting configurations for configuring a reflective surface in accordance with one or more aspects of the present disclosure. The device 705 may be an example of aspects of a UE 115 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to managing conflicting configurations for configuring a reflective surface). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to managing conflicting configurations for configuring a reflective surface). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of managing conflicting configurations for configuring a reflective surface as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device in accordance with examples as disclosed herein. For example, the communications manager 720 may be configured as or otherwise support a means for establishing a connection with a second device. The communications manager 720 may be configured as or otherwise support a means for transmitting, to a surface that is reflective of radio frequency signals, a message indicating a set of reflection coefficients for a set of reflective elements of the surface, the message further indicating a priority level of a communication scheduled between the first device and the second device, and the set of reflection coefficients based on a position of the second device relative to the first device and the surface.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for indicating a priority associated with signaled reflection coefficients, enabling a reconfigurable surface to determine which set of reflection coefficients to apply and increasing an experience of users in a wireless communications system.

Figure 8:
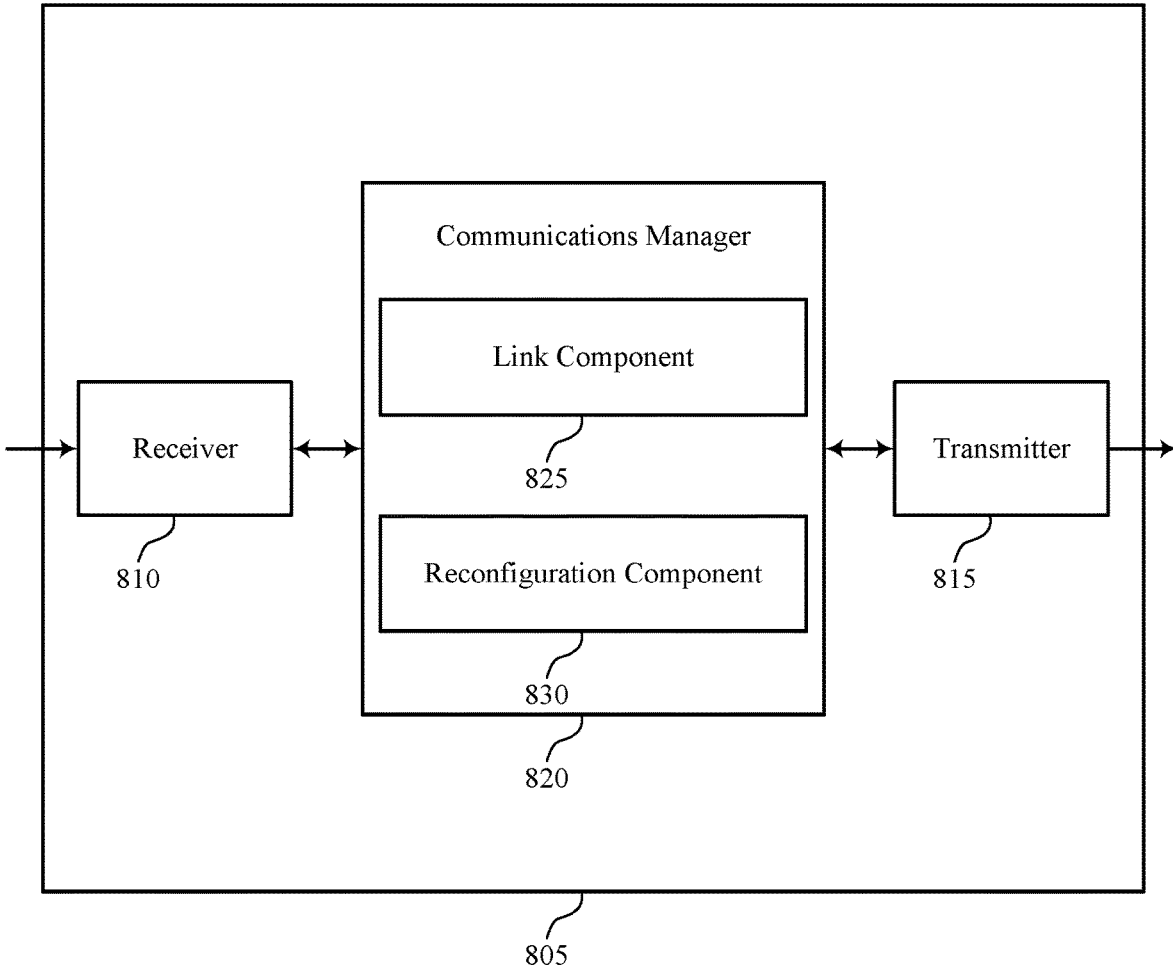

FIG. 8 shows a block diagram 800 of a device 805 that supports managing conflicting configurations for configuring a reflective surface in accordance with one or more aspects of the present disclosure. The device 805 may be an example of aspects of a device 705, a UE 115, or a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to managing conflicting configurations for configuring a reflective surface). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to managing conflicting configurations for configuring a reflective surface). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of managing conflicting configurations for configuring a reflective surface as described herein. For example, the communications manager 820 may include a link component 825 a reconfiguration component 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first device in accordance with examples as disclosed herein. The link component 825 may be configured as or otherwise support a means for establishing a connection with a second device. The reconfiguration component 830 may be configured as or otherwise support a means for transmitting, to a surface that is reflective of radio frequency signals, a message indicating a set of reflection coefficients for a set of reflective elements of the surface, the message further indicating a priority level of a communication scheduled between the first device and the second device, and the set of reflection coefficients based on a position of the second device relative to the first device and the surface.

Figure 9:
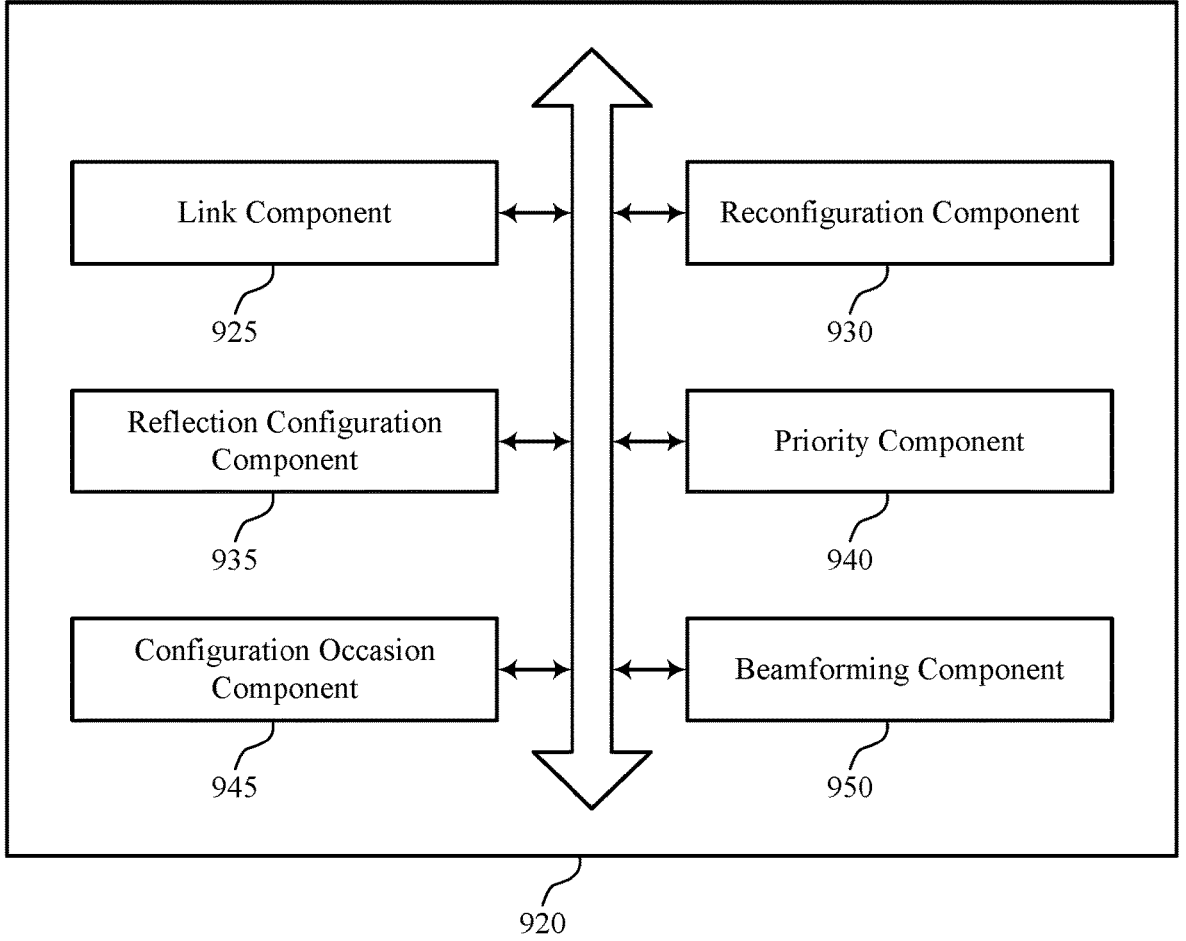
FIG. 9 shows a block diagram of a communications manager that supports managing conflicting configurations for configuring a reflective surface in accordance with one or more aspects of the present disclosure.

FIG. 9 shows a block diagram 900 of a communications manager 920 that supports managing conflicting configurations for configuring a reflective surface in accordance with one or more aspects of the present disclosure. The communications manager 920 may be an example of aspects of a communications manager 720, a communications manager 820, or both, as described herein. The communications manager 920, or various components thereof, may be an example of means for performing various aspects of managing conflicting configurations for configuring a reflective surface as described herein. For example, the communications manager 920 may include a link component 925, a reconfiguration component 930, a reflection configuration component 935, a priority component 940, a configuration occasion component 945, a beamforming component 950, or any combination thereof. Each of these components may communicate, directly or indirectly, with one another (e.g., via one or more buses).

The communications manager 920 may support wireless communication at a first device in accordance with examples as disclosed herein. The link component 925 may be configured as or otherwise support a means for establishing a connection with a second device. The reconfiguration component 930 may be configured as or otherwise support a means for transmitting, to a surface that is reflective of radio frequency signals, a message indicating a set of reflection coefficients for a set of reflective elements of the surface, the message further indicating a priority level of a communication scheduled between the first device and the second device, and the set of reflection coefficients based on a position of the second device relative to the first device and the surface.

In some examples, the reflection configuration component 935 may be configured as or otherwise support a means for determining the position of the second device relative to the surface. In some examples, the reflection configuration component 935 may be configured as or otherwise support a means for selecting, based on the position of the second device, an index corresponding to the set of reflection coefficients from a set of multiple sets of reflection coefficients. In some examples, the reconfiguration component 930 may be configured as or otherwise support a means for generating the message based on the index corresponding to the set of reflection coefficients.

In some examples, the priority component 940 may be configured as or otherwise support a means for determining one or more characteristics of the communication that are associated with the priority level of the communication, the one or more characteristics including an application associated with the communication, a quality of service associated with the communication, a quantity of devices served by the first device: an amount of data scheduled to be communicated in the communication within a time period, traffic statistics associated with a service provided by the first device, a duration associated with completing the communication: or any combination thereof. In some examples, the priority component 940 may be configured as or otherwise support a means for generating the message based on the one or more characteristics.

In some examples, the priority component 940 may be configured as or otherwise support a means for transmitting a second message reducing the priority level of the communication between the first device and the second device.

In some examples, the priority component 940 may be configured as or otherwise support a means for transmitting, to the surface, an identifier of a device that has been designated to resolve conflicts between devices.

In some examples, the first device is the device that has been designated to resolve conflicts between devices, and the message transmitted from the first device to the surface includes the identifier.

In some examples, the priority component 940 may be configured as or otherwise support a means for receiving, from a third device, a second message assigning the identifier to the first device.

In some examples, the priority component 940 may be configured as or otherwise support a means for receiving, based on transmitting the identifier to the surface, a request to select one set of reflection coefficients from a set of multiple sets of reflection coefficients associated with a set of multiple devices. In some examples, the reconfiguration component 930 may be configured as or otherwise support a means for selecting a second set of reflection coefficients based on priority levels associated with the set of multiple devices. In some examples, the reconfiguration component 930 may be configured as or otherwise support a means for transmitting, to the surface, a second message including an index corresponding to the second set of reflection coefficients.

In some examples, the configuration occasion component 945 may be configured as or otherwise support a means for determining an occasion for communicating messages including reflection coefficients to the surface, where the message is transmitted during the occasion.

In some examples, the reconfiguration component 930 may be configured as or otherwise support a means for receiving, from the surface, a second message indicating that the set of reflection coefficients is being applied for the surface. In some examples, the beamforming component 950 may be configured as or otherwise support a means for applying, based on the set of reflection coefficients being indicated in the second message, a set of beam coefficients to a signal for the second device to obtain a beam signal, where the beam signal is directed toward the surface based on the set of beam coefficients and a reflection of the signal off of the surface is directed toward the second device based on the set of reflection coefficients.

In some examples, the reconfiguration component 930 may be configured as or otherwise support a means for receiving, from the surface, a second message indicating that a different set of reflection coefficients is being applied for the surface. In some examples, the beamforming component 950 may be configured as or otherwise support a means for determining a set of beam coefficients for communicating with the second device based on the different set of reflection coefficients. In some examples, the beamforming component 950 may be configured as or otherwise support a means for applying the set of beam coefficients to a signal for the second device based on the determining.

Figure 10:
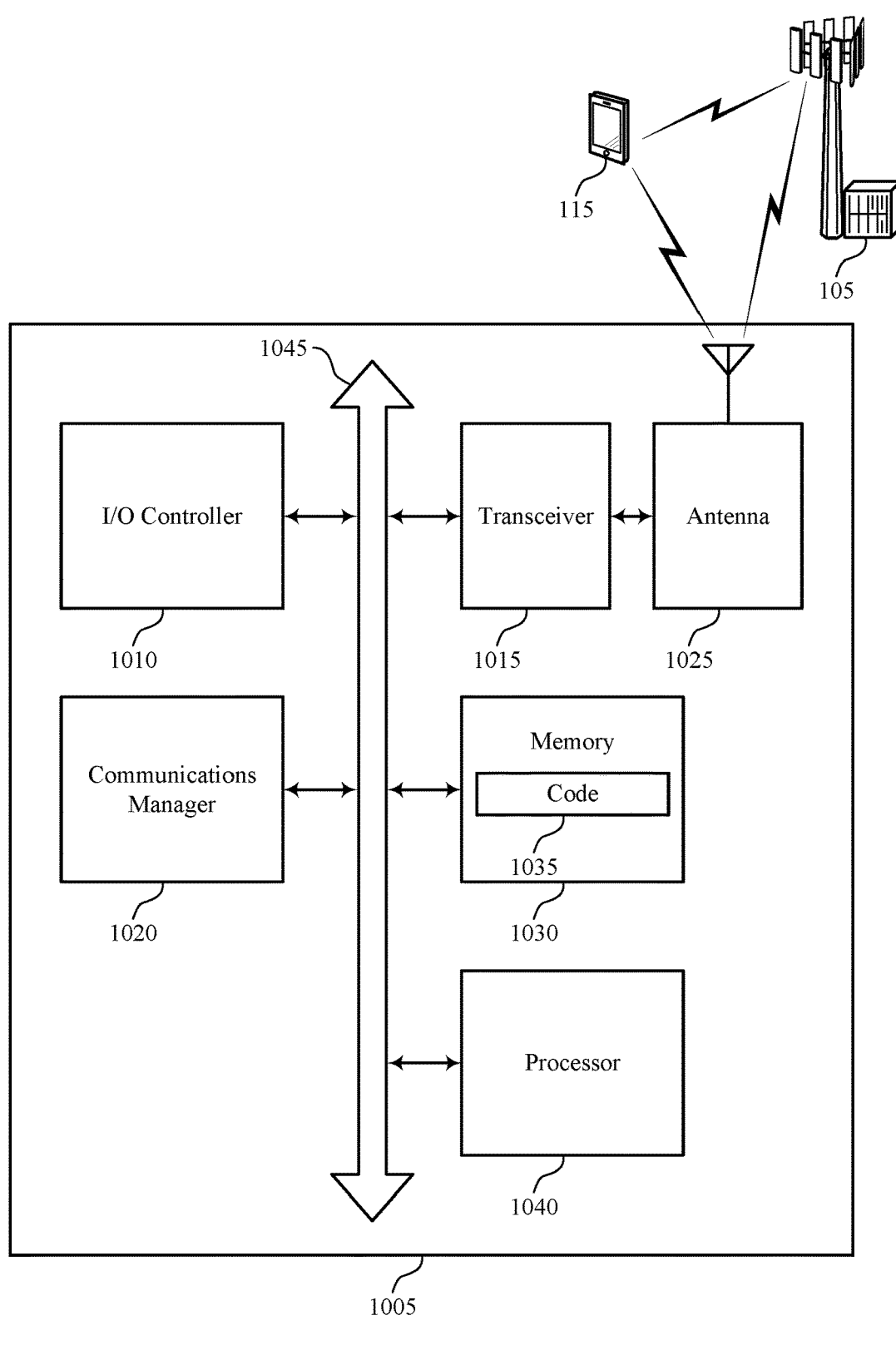
FIG. 10 shows a diagram of a system including a UE that supports managing conflicting configurations for configuring a reflective surface in accordance with one or more aspects of the present disclosure.

FIG. 10 shows a diagram of a system 1000 including a device 1005 that supports managing conflicting configurations for configuring a reflective surface in accordance with one or more aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOSR, ANDROIDR, MS-DOSR, MS-WINDOWS®, OS/2R), UNIX, LINUXR, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting managing conflicting configurations for configuring a reflective surface). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a first device in accordance with examples as disclosed herein. For example, the communications manager 1020 may be configured as or otherwise support a means for establishing a connection with a second device. The communications manager 1020 may be configured as or otherwise support a means for transmitting, to a surface that is reflective of radio frequency signals, a message indicating a set of reflection coefficients for a set of reflective elements of the surface, the message further indicating a priority level of a communication scheduled between the first device and the second device, and the set of reflection coefficients based on a position of the second device relative to the first device and the surface.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of managing conflicting configurations for configuring a reflective surface as described herein, or the processor 1040 and the memory 1030 may be otherwise configured to perform or support such operations.

Figure 11:
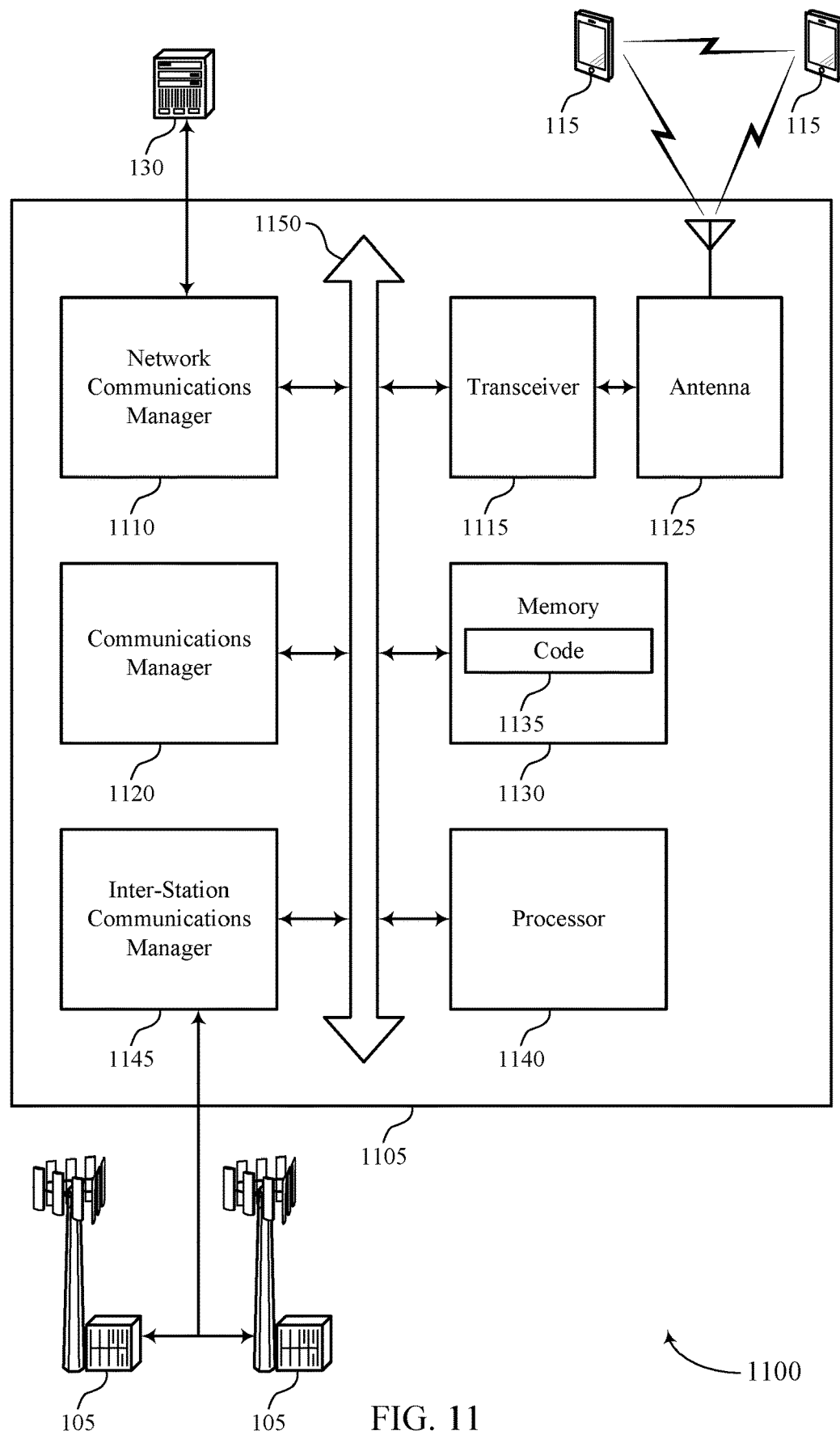
FIG. 11 shows a diagram of a system including a base station that supports managing conflicting configurations for configuring a reflective surface in accordance with one or more aspects of the present disclosure.

FIG. 11 shows a diagram of a system 1100 including a device 1105 that supports managing conflicting configurations for configuring a reflective surface in accordance with one or more aspects of the present disclosure. The device 1105 may be an example of or include the components of a device 705, a device 805, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 715, a transmitter 815, a receiver 710, a receiver 810, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting managing conflicting configurations for configuring a reflective surface). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a first device in accordance with examples as disclosed herein. For example, the communications manager 1120 may be configured as or otherwise support a means for establishing a connection with a second device. The communications manager 1120 may be configured as or otherwise support a means for transmitting, to a surface that is reflective of radio frequency signals, a message indicating a set of reflection coefficients for a set of reflective elements of the surface, the message further indicating a priority level of a communication scheduled between the first device and the second device, and the set of reflection coefficients based on a position of the second device relative to the first device and the surface.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of managing conflicting configurations for configuring a reflective surface as described herein, or the processor 1140 and the memory 1130 may be otherwise configured to perform or support such operations.

Figure 12:
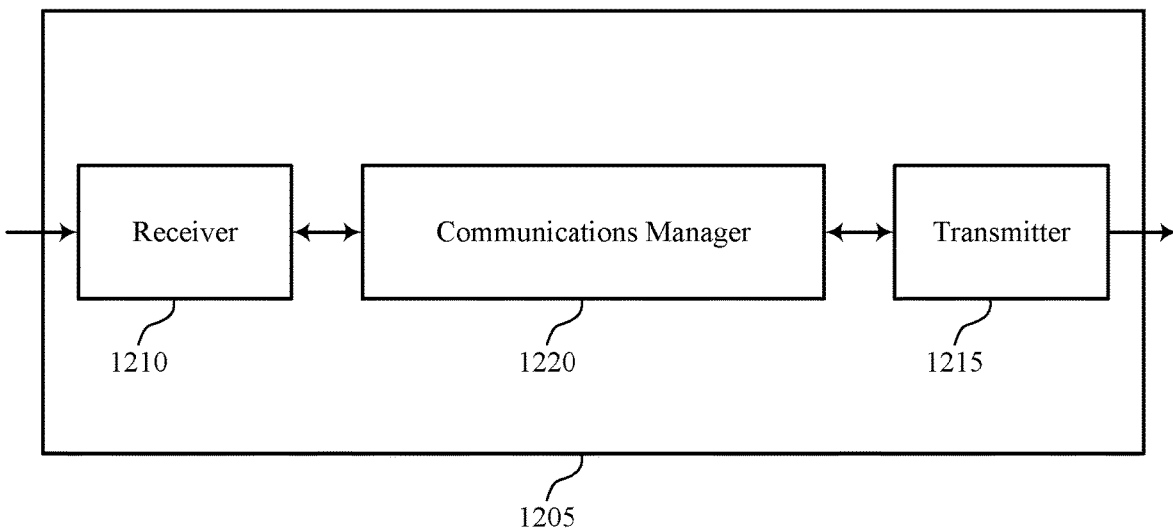
FIGS. 12 and 13 show block diagrams of devices that support managing conflicting configurations for configuring a reflective surface in accordance with one or more aspects of the present disclosure.

FIG. 12 shows a block diagram 1200 of a device 1205 that supports managing conflicting configurations for configuring a reflective surface in accordance with one or more aspects of the present disclosure. The device 1205 may be an example of aspects of a reconfigurable surface as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to managing conflicting configurations for configuring a reflective surface). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to managing conflicting configurations for configuring a reflective surface). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of managing conflicting configurations for configuring a reflective surface as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a surface that is reflective of radio frequency signals in accordance with examples as disclosed herein. For example, the communications manager 1220 may be configured as or otherwise support a means for receiving, from a first device, a first message including a first indication of a first set of reflection coefficients for a set of reflective elements, the first indication further indicating a first priority level of a first communication associated with the first device. The communications manager 1220 may be configured as or otherwise support a means for receiving, from a second device, a second message including a second indication of a second set of reflection coefficients for the set of reflective elements, the second indication indicating a second priority level of a second communication associated with the second device. The communications manager 1220 may be configured as or otherwise support a means for determining that the first priority level is greater than the second priority level based on the first message and the second message. The communications manager 1220 may be configured as or otherwise support a means for applying the first set of reflection coefficients to the set of reflective elements based on the determining.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for determining which reflection coefficients to apply to a reconfigurable surface based on priority information associated with sets of reflection coefficients received from multiple devices, enabling the reconfigurable surface to support the highest priority communications and increasing an experience of users in a wireless communications system.

Figure 13:

FIG. 13 shows a block diagram 1300 of a device 1305 that supports managing conflicting configurations for configuring a reflective surface in accordance with one or more aspects of the present disclosure. The device 1305 may be an example of aspects of a device 1205 or a reconfigurable surface as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to managing conflicting configurations for configuring a reflective surface). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to managing conflicting configurations for configuring a reflective surface). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of managing conflicting configurations for configuring a reflective surface as described herein. For example, the communications manager 1320 may include a reconfiguration component 1325, a priority component 1330, a reflection configuration component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a surface that is reflective of radio frequency signals in accordance with examples as disclosed herein. The reconfiguration component 1325 may be configured as or otherwise support a means for receiving, from a first device, a first message including a first indication of a first set of reflection coefficients for a set of reflective elements, the first indication further indicating a first priority level of a first communication associated with the first device. The reconfiguration component 1325 may be configured as or otherwise support a means for receiving, from a second device, a second message including a second indication of a second set of reflection coefficients for the set of reflective elements, the second indication indicating a second priority level of a second communication associated with the second device. The priority component 1330 may be configured as or otherwise support a means for determining that the first priority level is greater than the second priority level based on the first message and the second message. The reflection configuration component 1335 may be configured as or otherwise support a means for applying the first set of reflection coefficients to the set of reflective elements based on the determining.

Figure 14:
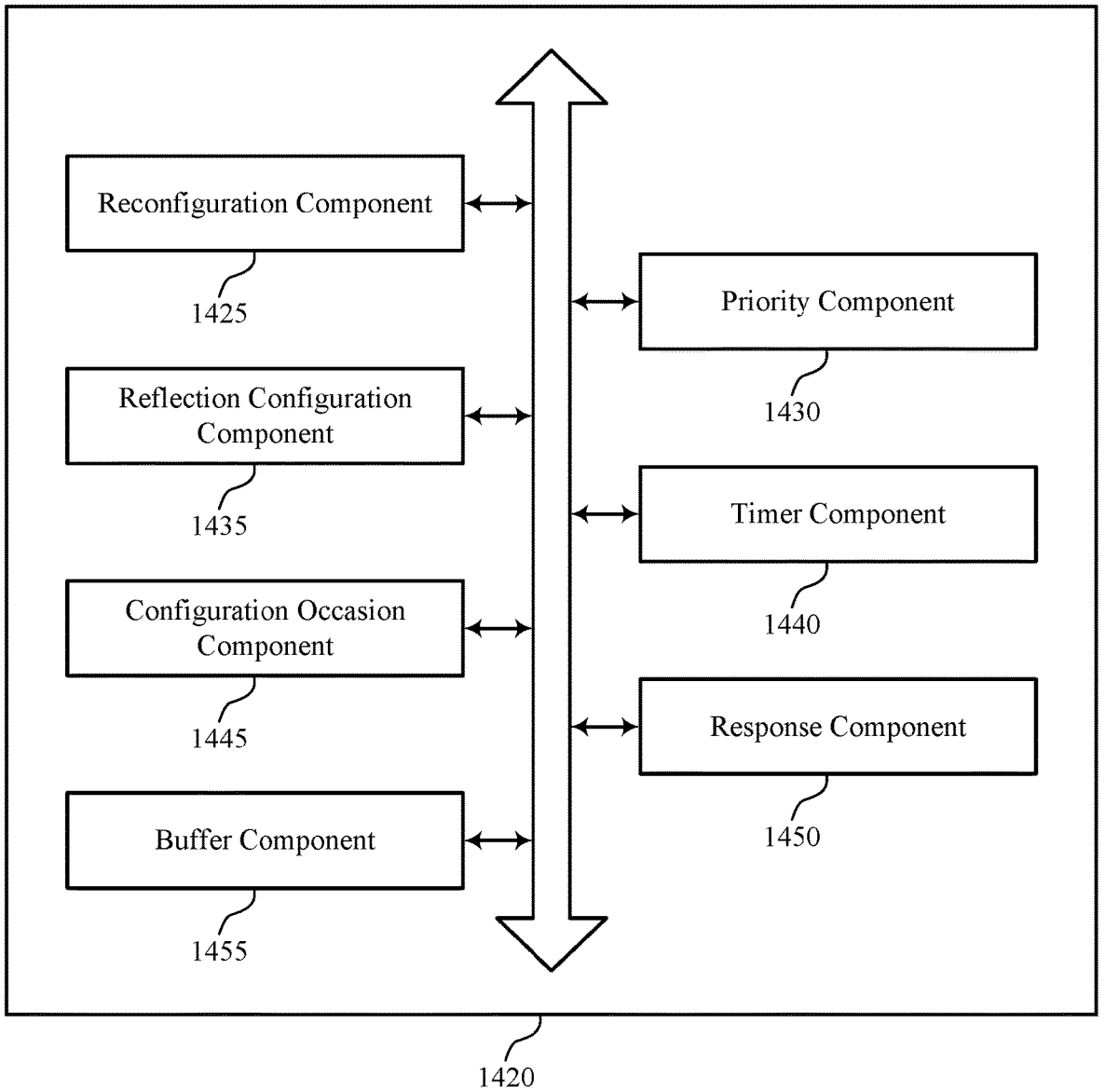
FIG. 14 shows a block diagram of a communications manager that supports managing conflicting configurations for configuring a reflective surface in accordance with one or more aspects of the present disclosure.

FIG. 14 shows a block diagram 1400 of a communications manager 1420 that supports managing conflicting configurations for configuring a reflective surface in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of managing conflicting configurations for configuring a reflective surface as described herein. For example, the communications manager 1420 may include a reconfiguration component 1425, a priority component 1430, a reflection configuration component 1435, a timer component 1440, a configuration occasion component 1445, a response component 1450, a buffer component 1455, or any combination thereof. Each of these components may communicate, directly or indirectly, with one another (e.g., via one or more buses).

The communications manager 1420 may support wireless communication at a surface that is reflective of radio frequency signals in accordance with examples as disclosed herein. The reconfiguration component 1425 may be configured as or otherwise support a means for receiving, from a first device, a first message including a first indication of a first set of reflection coefficients for a set of reflective elements, the first indication further indicating a first priority level of a first communication associated with the first device. In some examples, the reconfiguration component 1425 may be configured as or otherwise support a means for receiving, from a second device, a second message including a second indication of a second set of reflection coefficients for the set of reflective elements, the second indication indicating a second priority level of a second communication associated with the second device. The priority component 1430 may be configured as or otherwise support a means for determining that the first priority level is greater than the second priority level based on the first message and the second message. The reflection configuration component 1435 may be configured as or otherwise support a means for applying the first set of reflection coefficients to the set of reflective elements based on the determining.

In some examples, the priority component 1430 may be configured as or otherwise support a means for determining the first priority level for the first communication based on one or more first characteristics of the first communication indicated in the first message and the second priority level for the second communication based on one or more second characteristics of the second communication indicated in the second message. In some examples, the priority component 1430 may be configured as or otherwise support a means for comparing the first priority level and the second priority level, where the first priority level is determined as greater than the second priority level based on the comparing.

In some examples, the one or more first characteristics of the first communication includes a first application associated with the first communication, a first quality of service associated with the first communication, a first quantity of communication devices served by the first device, a first amount of data scheduled to be communicated in the first communication within a time period, first traffic statistics associated with a first service provided by the first device, a first duration associated with completing the first communication, or any combination thereof, and the one or more second characteristics of the second communication includes a second application associated with the second communication, a second quality of service associated with the second communication, a second quantity of communication devices served by the second device, a second amount of data scheduled to be communicated in the second communication within the time period: second traffic statistics associated with a second service provided by the second device, a second duration associated with completing the second communication, or any combination thereof.

In some examples, to support applying the first set of reflection coefficients to the set of reflective elements, the reflection configuration component 1435 may be configured as or otherwise support a means for applying the first set of reflection coefficients for at least the first duration based on determining that the first priority level is higher than the second priority level.

In some examples, the priority component 1430 may be configured as or otherwise support a means for receiving, from the first device, a third message reducing the first priority level of the first communication. In some examples, the reflection configuration component 1435 may be configured as or otherwise support a means for applying the second set of reflection coefficients to the set of reflective elements based on the first priority level being reduced.

In some examples, the reconfiguration component 1425 may be configured as or otherwise support a means for receiving, from a third device, a third message including a third indication of a third set of reflection coefficients for the set of reflective elements, the third indication indicating a third priority level of a third communication associated with the third device, the third priority level being greater than the first priority level. In some examples, the reflection configuration component 1435 may be configured as or otherwise support a means for applying, after applying the first set of reflection coefficients, the third set of reflection coefficients to the set of reflective elements based on the third priority level being greater than the first priority level.

In some examples, the reflection configuration component 1435 may be configured as or otherwise support a means for applying, based on receiving the first message, the first set of reflection coefficients to the set of reflective elements. In some examples, the timer component 1440 may be configured as or otherwise support a means for initiating a timer based on applying the first set of reflection coefficients, where the second message is received before an expiration of the timer. In some examples, the reflection configuration component 1435 may be configured as or otherwise support a means for continuing to apply the first set of reflection coefficients to the set of reflective elements until the expiration of the timer based on the first priority level being higher than the second priority level.

In some examples, the buffer component 1455 may be configured as or otherwise support a means for buffering the second message based on receiving the second message before the expiration of the timer. In some examples, the reflection configuration component 1435 may be configured as or otherwise support a means for applying the second set of reflection coefficients to the set of reflective elements at the expiration of the timer.

In some examples, the first message further includes an identifier of a device that has been designated to resolve conflicts between devices, and the first priority level is determined as being higher than the second priority level based on receiving the identifier in the first message.

In some examples, the priority component 1430 may be configured as or otherwise support a means for receiving, from a third device and based on the surface concurrently receiving the first message with the second message, a third message indicating that the first priority level is greater than the second priority level, where an identifier of a device that has been designated to resolve conflicts between devices being assigned to the third device.

In some examples, the configuration occasion component 1445 may be configured as or otherwise support a means for receiving the first message and the second message during an occasion for communicating messages including reflection coefficients to the surface. In some examples, the response component 1450 may be configured as or otherwise support a means for transmitting, after an end of the occasion, a third message indicating a selection of the first set of reflection coefficients for applying to the set of reflective elements.

In some examples, the third message includes an identifier of the first device, an index associated with the first set of reflection coefficients, or both.

Figure 15:
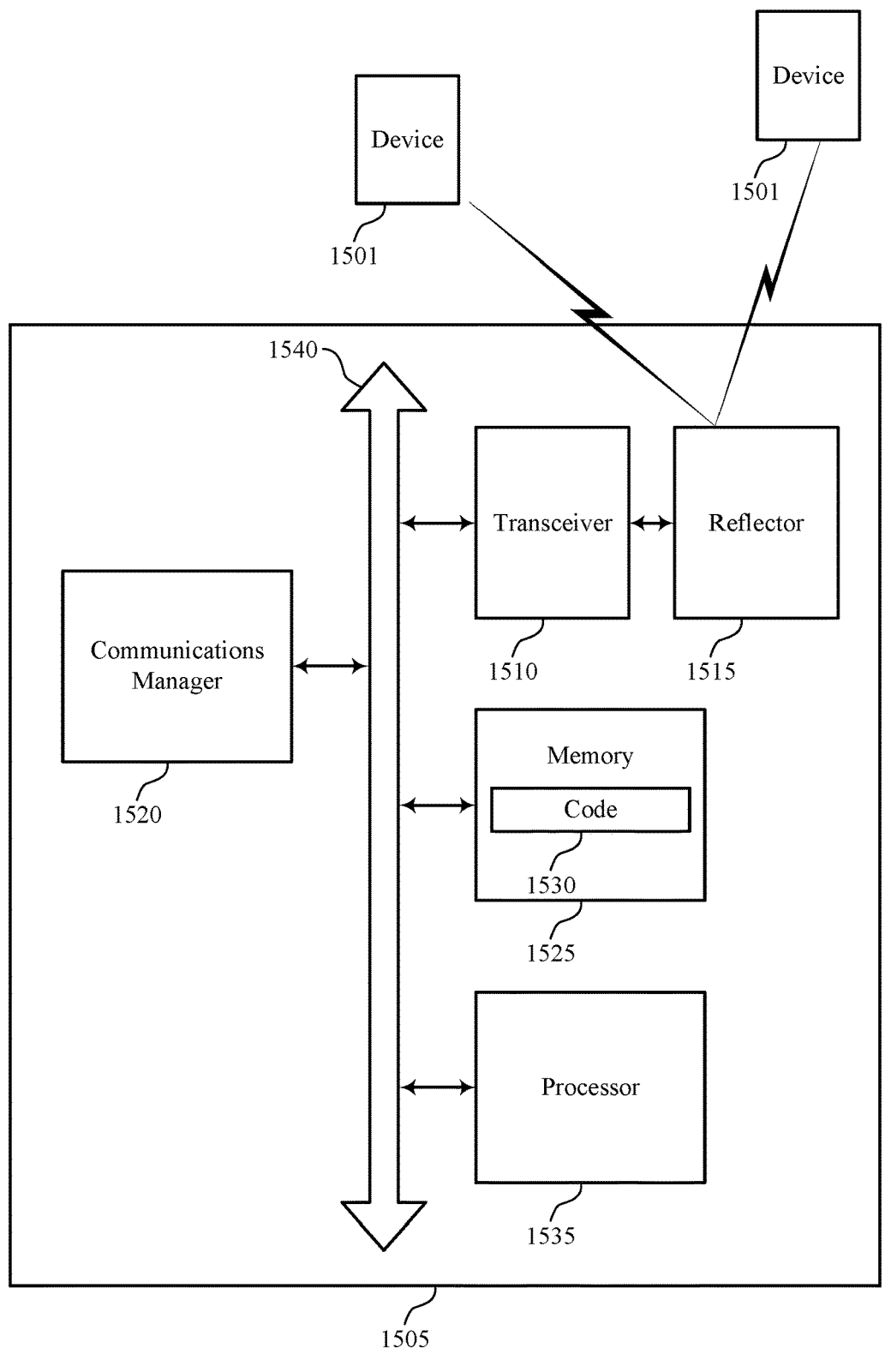
FIG. 15 shows a diagram of a system including a reconfigurable surface that supports managing conflicting configurations for configuring a reflective surface in accordance with one or more aspects of the present disclosure.

FIG. 15 shows a diagram of a system 1500 including a device 1505 that supports managing conflicting configurations for configuring a reflective surface in accordance with one or more aspects of the present disclosure. The device 1505 may be an example of or include the components of a device 1205, a device 1305, or a reconfigurable surface as described herein. Device 1505 may be configured to direct reflections of transmissions from one device 1501 (e.g., a base station or UE) in the direction of another device 1505 (e.g., a base station or UE).

The device 1505 may include components for bi-directional voice and data communications including components for transmitting and receiving communications, such as a communications manager 1520, a transceiver 1510, a reflector 1515, a memory 1525, code 1530, and a processor 1535. These components may be in electronic communication or otherwise coupled (e.g., operatively, communicatively, functionally, electronically, electrically) via one or more buses (e.g., a bus 1540).

In some cases, the device 1505 may include a reflector 1515. The reflector 1515 may include one or more reflective elements and may be referred to as a reflective surface, reconfigurable surface, or reconfigurable intelligent surface. In some examples, the reflector 1515 includes one or more antenna elements. The transceiver 1510 may be used to relay communications between devices, via the reflector 1515. In some examples, the transceiver 1510 may be coupled with one or more antennas used to received signals and may relay the received signal by transmitting modified versions of the received signals through the reflector 1515. In some examples, the transceiver 1510 applies reflection coefficients to the received signals before transmitting the received signals from the reflector 1515. The transceiver 1510 may be an example of a transmitter 1215, a transmitter 1315, a receiver 1210, a receiver 1310, or any combination thereof or component thereof, as described herein.

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting managing conflicting configurations for configuring a reflective surface). For example, the device 1505 or a component of the device 1505 may include a processor 1535 and memory 1525 coupled to the processor 1535, the processor 1535 and memory 1525 configured to perform various functions described herein.

The communications manager 1520 may support wireless communication at a controller of a surface reflective of radio frequency signals in accordance with examples as disclosed herein. For example, the communications manager 1520 may be configured as or otherwise support a means for receiving, from a first device, a first message comprising a first indication of a first set of reflection coefficients for a set of reflective elements, the first indication further indicating a first priority level of a first communication associated with the first device. The communications manager 1520 may be configured as or otherwise support a means for receiving, from a second device, a second message comprising a second indication of a second set of reflection coefficients for the set of reflective elements, the second indication indicating a second priority level of a second communication associated with the second device. The communications manager 1520 may be configured as or otherwise support a means for determining that the first priority level is greater than the second priority level based at least in part on the first message and the second message. The communications manager 1520 may be configured as or otherwise support a means for applying the first set of reflection coefficients to the set of reflective elements based at least in part on the determining.

In some examples, the communications manager 1520 may be configured to perform various operations (e.g., receiving, monitoring, transmitting) using or otherwise in cooperation with the transceiver 1510, the reflector 1515, or any combination thereof. Although the communications manager 1520 is illustrated as a separate component, in some examples, one or more functions described with reference to the communications manager 1520 may be supported by or performed by the processor 1535, the memory 1525, the code 1530, or any combination thereof. For example, the code 1530 may include instructions executable by the processor 1535 to cause the device 1505 to perform various aspects of managing conflicting configurations for configuring a reflective surface as described herein, or the processor 1535 and the memory 1525 may be otherwise configured to perform or support such operations.

FIG. 16 shows a flowchart illustrating a method 1600 that supports managing conflicting configurations for configuring a reflective surface in accordance with one or more aspects of the present disclosure. The operations of the method 1600 may be implemented by a UE or a base station or its components as described herein. For example, the operations of the method 1600 may be performed by a UE 115 or a base station 105 as described with reference to FIGS. 1 through 11. In some examples, a UE or a base station may execute a set of instructions to control the functional elements of the UE or the base station to perform the described functions. Additionally, or alternatively, the UE or the base station may perform aspects of the described functions using special-purpose hardware.

At 1605, the method may include establishing a connection with a second device. The operations of 1605 may be performed in accordance with examples as disclosed herein.

In some examples, aspects of the operations of 1605 may be performed by a link component 925 as described with reference to FIG. 9.

At 1610, the method may include transmitting, to a surface that is reflective of radio frequency signals, a message indicating a set of reflection coefficients for a set of reflective elements of the surface, the message further indicating a priority level of a communication scheduled between the first device and the second device, and the set of reflection coefficients based on a position of the second device relative to the first device and the surface. The operations of 1610 may be performed in accordance with examples as disclosed herein. In some examples, aspects of the operations of 1610 may be performed by a reconfiguration component 930 as described with reference to FIG. 9.

FIG. 17 shows a flowchart illustrating a method 1700 that supports managing conflicting configurations for configuring a reflective surface in accordance with one or more aspects of the present disclosure. The operations of the method 1700 may be implemented by a UE or a base station or its components as described herein. For example, the operations of the method 1700 may be performed by a UE 115 or a base station 105 as described with reference to FIGS. 1 through 11. In some examples, a UE or a base station may execute a set of instructions to control the functional elements of the UE or the base station to perform the described functions. Additionally, or alternatively, the UE or the base station may perform aspects of the described functions using special-purpose hardware.

At 1705, the method may include establishing a connection with a second device. The operations of 1705 may be performed in accordance with examples as disclosed herein. In some examples, aspects of the operations of 1705 may be performed by a link component 925 as described with reference to FIG. 9.

At 1710, the method may include determining an occasion for communicating messages including reflection coefficients to the surface, where the message is transmitted during the occasion. The operations of 1715 may be performed in accordance with examples as disclosed herein. In some examples, aspects of the operations of 1715 may be performed by a configuration occasion component 945 as described with reference to FIG. 9.

At 1715, the method may include transmitting, to a surface that is reflective of radio frequency signals, a message indicating a set of reflection coefficients for a set of reflective elements of the surface, the message further indicating a priority level of a communication scheduled between the first device and the second device, and the set of reflection coefficients based on a position of the second device relative to the first device and the surface. The operations of 1710 may be performed in accordance with examples as disclosed herein. In some examples, aspects of the operations of 1710 may be performed by a reconfiguration component 930 as described with reference to FIG. 9.

FIG. 18 shows a flowchart illustrating a method 1800 that supports managing conflicting configurations for configuring a reflective surface in accordance with one or more aspects of the present disclosure. The operations of the method 1800 may be implemented by a reconfigurable surface or its components as described herein. For example, the operations of the method 1800 may be performed by a reconfigurable surface as described with reference to FIGS. 1 through 6 and 12 through 15. In some examples, a reconfigurable surface may execute a set of instructions to control the functional elements of the reconfigurable surface to perform the described functions. Additionally, or alternatively, the reconfigurable surface may perform aspects of the described functions using special-purpose hardware.

At 1805, the method may include receiving, from a first device, a first message including a first indication of a first set of reflection coefficients for a set of reflective elements, the first indication further indicating a first priority level of a first communication associated with the first device. The operations of 1805 may be performed in accordance with examples as disclosed herein. In some examples, aspects of the operations of 1805 may be performed by a reconfiguration component 1425 as described with reference to FIG. 14.

At 1810, the method may include receiving, from a second device, a second message including a second indication of a second set of reflection coefficients for the set of reflective elements, the second indication indicating a second priority level of a second communication associated with the second device. The operations of 1810 may be performed in accordance with examples as disclosed herein. In some examples, aspects of the operations of 1810 may be performed by a reconfiguration component 1425 as described with reference to FIG. 14.

At 1815, the method may include determining that the first priority level is greater than the second priority level based on the first message and the second message. The operations of 1815 may be performed in accordance with examples as disclosed herein. In some examples, aspects of the operations of 1815 may be performed by a priority component 1430 as described with reference to FIG. 14.

At 1820, the method may include applying the first set of reflection coefficients to the set of reflective elements based on the determining. The operations of 1820 may be performed in accordance with examples as disclosed herein. In some examples, aspects of the operations of 1820 may be performed by a reflection configuration component 1435 as described with reference to FIG. 14.

The following provides an overview of aspects of the present disclosure:

Aspect 1: A method for wireless communication at a first device, comprising: establishing a connection with a second device; and transmitting, to a surface that is reflective of radio frequency signals, a message indicating a set of reflection coefficients for a set of reflective elements of the surface, the message further indicating a priority level of a communication scheduled between the first device and the second device, and the set of reflection coefficients based at least in part on a position of the second device relative to the first device and the surface.

Aspect 2: The method of aspect 1, further comprising: determining the position of the second device relative to the surface: selecting, based at least in part on the position of the second device, an index corresponding to the set of reflection coefficients from a plurality of sets of reflection coefficients: and generating the message based at least in part on the index corresponding to the set of reflection coefficients.

Aspect 3: The method of any of aspects 1 through 2, further comprising: determining one or more characteristics of the communication that are associated with the priority level of the communication, the one or more characteristics comprising an application associated with the communication, a quality of service associated with the communication, a quantity of devices served by the first device: an amount of data scheduled to be communicated in the communication within a time period, traffic statistics associated with a service provided by the first device, a duration associated with completing the communication: or any combination thereof; and generating the message based at least in part on the one or more characteristics.

Aspect 4: The method of any of aspects 1 through 3, further comprising: transmitting a second message reducing the priority level of the communication between the first device and the second device.

Aspect 5: The method of any of aspects 1 through 4, further comprising: transmitting, to the surface, an identifier of a device that has been designated to resolve conflicts between devices.

Aspect 6: The method of aspect 5, wherein the first device is the device that has been designated to resolve conflicts between devices, and the message transmitted from the first device to the surface comprises the identifier.

Aspect 7: The method of aspect 6, further comprising: receiving, from a third device, a second message assigning the identifier to the first device.

Aspect 8: The method of any of aspects 5 through 7, further comprising: receiving, based at least in part on transmitting the identifier to the surface, a request to select one set of reflection coefficients from a plurality of sets of reflection coefficients associated with a plurality of devices: selecting a second set of reflection coefficients based at least in part on priority levels associated with the plurality of devices: and transmitting, to the surface, a second message comprising an index corresponding to the second set of reflection coefficients.

Aspect 9: The method of any of aspects 1 through 8, further comprising: determining an occasion for communicating messages comprising reflection coefficients to the surface, wherein the message is transmitted during the occasion.

Aspect 10: The method of aspect 9, further comprising: receiving, from the surface, a second message indicating that the set of reflection coefficients is being applied for the surface: and applying, based at least in part on the set of reflection coefficients being indicated in the second message, a set of beam coefficients to a signal for the second device to obtain a beam signal, wherein the beam signal is directed toward the surface based at least in part on the set of beam coefficients and a reflection of the signal off of the surface is directed toward the second device based at least in part on the set of reflection coefficients.

Aspect 11: The method of any of aspects 9, further comprising: receiving, from the surface, a second message indicating that a different set of reflection coefficients is being applied for the surface: determining a set of beam coefficients for communicating with the second device based at least in part on the different set of reflection coefficients: and applying the set of beam coefficients to a signal for the second device based at least in part on the determining.

Aspect 12: A method for wireless communication at a surface that is reflective of radio frequency signals, comprising: receiving, from a first device, a first message comprising a first indication of a first set of reflection coefficients for a set of reflective elements, the first indication further indicating a first priority level of a first communication associated with the first device: receiving, from a second device, a second message comprising a second indication of a second set of reflection coefficients for the set of reflective elements, the second indication indicating a second priority level of a second communication associated with the second device: determining that the first priority level is greater than the second priority level based at least in part on the first message and the second message: and applying the first set of reflection coefficients to the set of reflective elements based at least in part on the determining.

Aspect 13: The method of aspect 12, further comprising: determining the first priority level for the first communication based at least in part on one or more first characteristics of the first communication indicated in the first message and the second priority level for the second communication based at least in part on one or more second characteristics of the second communication indicated in the second message: and comparing the first priority level and the second priority level, wherein the first priority level is determined as greater than the second priority level based at least in part on the comparing.

Aspect 14: The method of aspect 13, wherein the one or more first characteristics of the first communication comprises a first application associated with the first communication, a first quality of service associated with the first communication, a first quantity of communication devices served by the first device, a first amount of data scheduled to be communicated in the first communication within a time period, first traffic statistics associated with a first service provided by the first device, a first duration associated with completing the first communication, or any combination thereof, and the one or more second characteristics of the second communication comprises a second application associated with the second communication, a second quality of service associated with the second communication, a second quantity of communication devices served by the second device, a second amount of data scheduled to be communicated in the second communication within the time period: second traffic statistics associated with a second service provided by the second device, a second duration associated with completing the second communication, or any combination thereof.

Aspect 15: The method of aspect 14, wherein applying the first set of reflection coefficients to the set of reflective elements comprises: applying the first set of reflection coefficients for at least the first duration based at least in part on determining that the first priority level is higher than the second priority level.

Aspect 16: The method of any of aspects 12 through 15, further comprising: receiving, from the first device, a third message reducing the first priority level of the first communication: and applying the second set of reflection coefficients to the set of reflective elements based at least in part on the first priority level being reduced.

Aspect 17: The method of any of aspects 12 through 16, further comprising: receiving, from a third device, a third message comprising a third indication of a third set of reflection coefficients for the set of reflective elements, the third indication indicating a third priority level of a third communication associated with the third device, the third priority level being greater than the first priority level: and applying, after applying the first set of reflection coefficients, the third set of reflection coefficients to the set of reflective elements based at least in part on the third priority level being greater than the first priority level.

Aspect 18: The method of any of aspects 12 through 17, further comprising: applying, based at least in part on receiving the first message, the first set of reflection coefficients to the set of reflective elements: initiating a timer based at least in part on applying the first set of reflection coefficients, wherein the second message is received before an expiration of the timer: and continuing to apply the first set of reflection coefficients to the set of reflective elements until the expiration of the timer based at least in part on the first priority level being higher than the second priority level.

Aspect 19: The method of aspect 18, further comprising: buffering the second message based at least in part on receiving the second message before the expiration of the timer: and applying the second set of reflection coefficients to the set of reflective elements at the expiration of the timer.

Aspect 20: The method of any of aspects 12 through 19, wherein the first message further comprises an identifier of a device that has been designated to resolve conflicts between devices, and the first priority level is determined as being higher than the second priority level based at least in part on receiving the identifier in the first message.

Aspect 21: The method of any of aspects 12 through 20, further comprising: receiving, from a third device and based at least in part on the surface concurrently receiving the first message with the second message, a third message indicating that the first priority level is greater than the second priority level, wherein an identifier of a device that has been designated to resolve conflicts between devices being assigned to the third device.

Aspect 22: The method of any of aspects 12 through 21, further comprising: receiving the first message and the second message during an occasion for communicating messages comprising reflection coefficients to the surface; and transmitting, after an end of the occasion, a third message indicating a selection of the first set of reflection coefficients for applying to the set of reflective elements.

Aspect 23: The method of aspect 22, wherein the third message comprises an identifier of the first device, an index associated with the first set of reflection coefficients, or both.

Aspect 24: An apparatus for wireless communication at a first device, comprising a processor and memory coupled to the processor, the processor and memory configured to perform a method of any of aspects 1 through 11.

Aspect 25: An apparatus for wireless communication at a first device, comprising at least one means for performing a method of any of aspects 1 through 11.

Aspect 26: A non-transitory computer-readable medium storing code for wireless communication at a first device, the code comprising instructions executable by a processor to perform a method of any of aspects 1 through 11.

Aspect 27: An apparatus for wireless communication at a surface that is reflective of radio frequency signals, comprising a processor and memory, the processor and memory and memory configured to perform a method of any of aspects 12 through 23.

Aspect 28: An apparatus for wireless communication at a surface that is reflective of radio frequency signals, comprising at least one means for performing a method of any of aspects 12 through 23.

Aspect 29: A non-transitory computer-readable medium storing code for wireless communication at a surface that is reflective of radio frequency signals, the code comprising instructions executable by a processor to perform a method of any of aspects 12 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, including in the claims, "set" as used in a list of items (e.g., a list of items prefaced by a phrase such as "a set of") indicates a set that includes at least one of the items, and excludes a null set.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
   one or more memories; and
   one or more processors coupled with the one or more memories and configured to cause the first device to:
      establish a connection with a second device; and
      transmit, to a surface that is reflective of radio frequency signals, a message that indicates a set of reflection coefficients for a set of reflective elements of the surface, wherein the message further indicates a priority level of a communication scheduled between the first device and the second device, and wherein the set of reflection coefficients is based at least in part on a position of the second device relative to the first device and the surface.

2. The apparatus of claim 1, further comprising:
   an antenna, wherein the one or more processors are further configured to cause the first device to:
      determine the position of the second device relative to the surface;
      select, based at least in part on the position of the second device, an index corresponding to the set of reflection coefficients from a plurality of sets of reflection coefficients; and
      generate the message based at least in part on the index corresponding to the set of reflection coefficients.

3. The apparatus of claim 1, wherein the one or more processors are further configured to cause the first device to:
   determine one or more characteristics of the communication that are associated with the priority level of the communication, the one or more characteristics comprising:
      an application associated with the communication,
      a quality of service associated with the communication,
      a quantity of devices served by the first device;
      an amount of data scheduled to be communicated in the communication within a time period,
      traffic statistics associated with a service provided by the first device,
      a duration associated with completion of the communication; or
      any combination thereof; and
   generate the message based at least in part on the one or more characteristics.

4. The apparatus of claim 1, wherein the one or more processors are further configured to cause the first device to:
   transmit a second message indicating to reduce the priority level of the communication between the first device and the second device.

5. The apparatus of claim 1, wherein the one or more processors are further configured to cause the first device to:
   transmit, to the surface, an identifier of a device that has been designated to resolve conflicts between devices.

6. The apparatus of claim 5, wherein the first device is the device that has been designated to resolve conflicts between devices, and the message transmitted from the first device to the surface comprises the identifier.

7. The apparatus of claim 6, wherein the one or more processors are further configured to cause the first device to:
   receive, from a third device, a second message to assign the identifier to the first device.

8. The apparatus of claim 5, wherein the one or more processors are further configured to cause the first device to:
   receive, based at least in part on transmission of the identifier to the surface, a request to select one set of reflection coefficients from a plurality of sets of reflection coefficients associated with a plurality of devices;
   select a second set of reflection coefficients based at least in part on priority levels associated with the plurality of devices; and
   transmit, to the surface, a second message comprising an index corresponding to the second set of reflection coefficients.

9. The apparatus of claim 1, wherein the one or more processors are further configured to cause the first device to:
   determine an occasion for communication of messages comprising reflection coefficients to the surface, wherein the message is transmitted during the occasion.

10. The apparatus of claim 9, wherein the one or more processors are further configured to cause the first device to:
   receive, from the surface, a second message that indicates that the set of reflection coefficients is being applied for the surface; and
   apply, based at least in part on the set of reflection coefficients being indicated in the second message, a set of beam coefficients to a signal for the second device to obtain a beam signal, wherein the beam signal is directed toward the surface based at least in part on the set of beam coefficients and a reflection of the signal off of the surface is directed toward the second device based at least in part on the set of reflection coefficients.

11. The apparatus of claim 9, wherein the one or more processors are further configured to cause the first device to:
   receive, from the surface, a second message that indicates a different set of reflection coefficients applied for the surface;
   determine a set of beam coefficients based at least in part on the different set of reflection coefficients; and
   apply the set of beam coefficients to a signal for the second device.

12. An apparatus for wireless communication at a surface that is reflective of radio frequency signals, comprising:
   one or more memories; and
   one or more processors coupled with the one or more memories and configured to:
      receive, from a first device, a first message comprising a first indication of a first set of reflection coefficients for a set of reflective elements, wherein the first indication indicates a first priority level of a first communication associated with the first device;
      receive, from a second device, a second message comprising a second indication of a second set of reflection coefficients for the set of reflective elements, wherein the second indication indicates a second priority level of a second communication associated with the second device;
      determine that the first priority level is greater than the second priority level based at least in part on the first message and the second message; and apply the first set of reflection coefficients to the set of reflective elements based at least in part on the first priority level being greater than the second priority level.

13. The apparatus of claim 12, wherein the one or more processors are further configured to:

determine the first priority level for the first communication based at least in part on one or more first characteristics of the first communication indicated in the first message and the second priority level for the second communication based at least in part on one or more second characteristics of the second communication indicated in the second message; and compare the first priority level and the second priority level, wherein the first priority level is determined as greater than the second priority level based at least in part on the first priority level being compared to the second priority level.

14. The apparatus of claim 13, wherein:

the one or more first characteristics of the first communication comprise:

a first application associated with the first communication, a first quality of service associated with the first communication, a first quantity of communication devices served by the first device, a first amount of data scheduled to be communicated in the first communication within a time period, first traffic statistics associated with a first service provided by the first device, a first duration associated with completion of the first communication, or any combination thereof, and the one or more second characteristics of the second communication comprise:

a second application associated with the second communication, a second quality of service associated with the second communication, a second quantity of communication devices served by the second device, a second amount of data scheduled to be communicated in the second communication within the time period, second traffic statistics associated with a second service provided by the second device, a second duration associated with completion of the second communication, or any combination thereof.

15. The apparatus of claim 14, wherein, to apply the first set of reflection coefficients to the set of reflective elements, the one or more processors are further configured to:

apply the first set of reflection coefficients for at least the first duration based at least in part on a determination that the first priority level is higher than the second priority level.

16. The apparatus of claim 12, wherein the one or more processors are further configured to:

receive, from the first device, a third message to reduce the first priority level of the first communication; and apply the second set of reflection coefficients to the set of reflective elements based at least in part on a reduction of the first priority level.

17. The apparatus of claim 12, wherein the one or more processors are further configured to:

receive, from a third device, a third message comprising a third indication of a third set of reflection coefficients for the set of reflective elements, wherein the third indication indicates a third priority level of a third communication associated with the third device, wherein the third priority level is greater than the first priority level; and apply, after application of the first set of reflection coefficients, the third set of reflection coefficients to the set of reflective elements based at least in part on the third priority level being greater than the first priority level.

18. The apparatus of claim 12, wherein the one or more processors are further configured to:

apply, based at least in part on reception of the first message, the first set of reflection coefficients to the set of reflective elements;

initiate a timer based at least in part on application of the first set of reflection coefficients, wherein the second message is received before an expiration of the timer; and continue to apply the first set of reflection coefficients to the set of reflective elements until the expiration of the timer based at least in part on the first priority level being higher than the second priority level.

19. The apparatus of claim 18, wherein the one or more processors are further configured to:

buffer the second message based at least in part on reception of the second message before the expiration of the timer; and apply the second set of reflection coefficients to the set of reflective elements at the expiration of the timer.

20. The apparatus of claim 12, wherein the first message further comprises an identifier of a device that has been designated to resolve conflicts between devices, and the first priority level is determined as being higher than the second priority level based at least in part on reception of the identifier in the first message.

21. The apparatus of claim 12, wherein the one or more processors are further configured to:

receive, from a third device and based at least in part on concurrent reception of the first message and the second message, a third message that indicates that the first priority level is greater than the second priority level, wherein an identifier of a device that has been designated to resolve conflicts between devices is assigned to the third device.

22. The apparatus of claim 12, wherein the one or more processors are further configured to:

receive the first message and the second message during an occasion for communication of messages; and transmit, after an end of the occasion, a third message that indicates a selection of the first set of reflection coefficients for application to the set of reflective elements.

23. The apparatus of claim 22, wherein the third message comprises an identifier of the first device, an index associated with the first set of reflection coefficients, or both.

24. A method for wireless communication at a first device, comprising:

establishing a connection with a second device; and transmitting, to a surface that is reflective of radio frequency signals, a message indicating a set of reflection coefficients for a set of reflective elements of the surface, the message further indicating a priority level of a communication scheduled between the first device and the second device, and the set of reflection coefficients based at least in part on a position of the second device relative to the first device and the surface.

25. The method of claim 24, further comprising:

determining the position of the second device relative to the surface;

selecting, based at least in part on the position of the second device, an index corresponding to the set of reflection coefficients from a plurality of sets of reflection coefficients; and generating the message based at least in part on the index corresponding to the set of reflection coefficients.

26. The method of claim 24, further comprising:

determining one or more characteristics of the communication that are associated with the priority level of the communication, the one or more characteristics comprising:

an application associated with the communication, a quality of service associated with the communication, a quantity of devices served by the first device, an amount of data scheduled to be communicated in the communication within a time period, traffic statistics associated with a service provided by the first device, a duration associated with completing the communication, or any combination thereof; and generating the message based at least in part on the one or more characteristics.

27. The method of claim 24, further comprising:

transmitting a second message reducing the priority level of the communication between the first device and the second device.

28. A method for wireless communication at a surface that is reflective of radio frequency signals, comprising:

receiving, from a first device, a first message comprising a first indication of a first set of reflection coefficients for a set of reflective elements of the surface, the first indication further indicating a first priority level of a first communication associated with the first device;

receiving, from a second device, a second message comprising a second indication of a second set of reflection coefficients for the set of reflective elements, the second indication indicating a second priority level of a second communication associated with the second device;

determining that the first priority level is greater than the second priority level based at least in part on the first message and the second message; and applying the first set of reflection coefficients to the set of reflective elements based at least in part on the determining.

29. The method of claim 28, further comprising:

determining the first priority level for the first communication based at least in part on one or more first characteristics of the first communication indicated in the first message and the second priority level for the second communication based at least in part on one or more second characteristics of the second communication indicated in the second message; and comparing the first priority level and the second priority level, wherein the first priority level is determined as greater than the second priority level based at least in part on the comparing.

30. The method of claim 29, wherein:

the one or more first characteristics of the first communication comprise:

a first application associated with the first communication, a first quality of service associated with the first communication, a first quantity of communication devices served by the first device, a first amount of data scheduled to be communicated in the first communication within a time period, first traffic statistics associated with a first service provided by the first device, a first duration associated with completing the first communication, or any combination thereof, and the one or more second characteristics of the second communication comprise:

a second application associated with the second communication, a second quality of service associated with the second communication, a second quantity of communication devices served by the second device, a second amount of data scheduled to be communicated in the second communication within the time period; second traffic statistics associated with a second service provided by the second device, a second duration associated with completing the second communication, or any combination thereof.

* * * * *